(12) United States Patent
Sugio et al.

(10) Patent No.: US 10,298,926 B2
(45) Date of Patent: May 21, 2019

(54) IMAGE CODING METHOD, IMAGE DECODING METHOD, IMAGE CODING APPARATUS, AND IMAGE DECODING APPARATUS

(71) Applicant: Sun Patent Trust, New York, NY (US)

(72) Inventors: Toshiyasu Sugio, Osaka (JP); Takahiro Nishi, Nara (JP); Youji Shibahara, Tokyo (JP); Hisao Sasai, Osaka (JP)

(73) Assignee: SUN PATENT TRUST, New York, NY (US)

( * ) Notice: Subject to any disclaimer, the term of this patent is extended or adjusted under 35 U.S.C. 154(b) by 0 days.

(21) Appl. No.: 15/897,815

(22) Filed: Feb. 15, 2018

(65) Prior Publication Data

US 2018/0176558 A1    Jun. 21, 2018

Related U.S. Application Data

(63) Continuation of application No. 15/445,295, filed on Feb. 28, 2017, now Pat. No. 9,930,334, which is a
(Continued)

(51) Int. Cl.
*H04N 19/51* (2014.01)
*H04N 19/52* (2014.01)
(Continued)

(52) U.S. Cl.
CPC ......... *H04N 19/115* (2014.11); *H04N 19/103* (2014.11); *H04N 19/146* (2014.11);
(Continued)

(58) Field of Classification Search
CPC .. H04N 19/115; H04N 19/103; H04N 19/146; H04N 19/172; H04N 19/176; H04N 19/51; H04N 19/52
See application file for complete search history.

(56) References Cited

U.S. PATENT DOCUMENTS

| 7,280,700 B2 | 10/2007 | Tourapis et al. |
| 8,031,766 B2 | 10/2011 | Cote |

(Continued)

FOREIGN PATENT DOCUMENTS

| EP | 1 835 748 | 5/2013 |
| JP | 2004-215229 | 7/2004 |

(Continued)

OTHER PUBLICATIONS

International Search Report dated Dec. 6, 2011 in International (PCT) Application No. PCT/JP2011/005323.
(Continued)

*Primary Examiner* — Tracy Y. Li
(74) *Attorney, Agent, or Firm* — Wenderoth, Lind & Ponack, L.L.P.

(57) ABSTRACT

An image coding method includes: generating a first flag indicating whether or not a motion vector predictor is to be selected from among one or more motion vector predictor candidates; generating a second flag indicating whether or not a motion vector predictor is to be selected from among the one or more motion vector predictor candidates in coding a current block to be coded in a predetermined coding mode, when the first flag indicates that a motion vector predictor is to be selected; and generating a coded signal in which the first flag and the second flag are included in header information, when the first flag indicates that a motion vector predictor is to be selected.

2 Claims, 38 Drawing Sheets

Related U.S. Application Data continuation of application No. 15/170,223, filed on Jun. 1, 2016, now Pat. No. 9,621,915, which is a continuation of application No. 14/447,970, filed on Jul. 31, 2014, now Pat. No. 9,392,298, which is a continuation of application No. 13/816,370, filed as application No. PCT/JP2011/005323 on Sep. 21, 2011, now Pat. No. 8,848,805.

(60) Provisional application No. 61/386,161, filed on Sep. 24, 2010.

(51) Int. Cl.
| | | |
|---|---|---|
| *H04N 19/103* | (2014.01) | |
| *H04N 19/115* | (2014.01) | |
| *H04N 19/146* | (2014.01) | |
| *H04N 19/172* | (2014.01) | |
| *H04N 19/176* | (2014.01) | |

(52) U.S. Cl.
CPC ......... *H04N 19/172* (2014.11); *H04N 19/176* (2014.11); *H04N 19/51* (2014.11); *H04N 19/52* (2014.11)

(56) References Cited

U.S. PATENT DOCUMENTS

| | | | |
|---|---|---|---|
| 8,144,776 B2 | 3/2012 | Yamori et al. | |
| 8,204,321 B2 | 6/2012 | Rossato et al. | |
| 8,527,649 B2 | 9/2013 | Wexler et al. | |
| 8,588,302 B2 | 11/2013 | Einarsson | |
| 8,837,594 B2 * | 9/2014 | Suzuki | H04N 19/176 375/240.16 |
| 9,185,424 B2 | 11/2015 | Teng | |
| 9,219,914 B2 | 12/2015 | Park | |
| 2005/0141612 A1 | 6/2005 | Abe et al. | |
| 2007/0217510 A1 | 9/2007 | Yamori et al. | |
| 2008/0069235 A1 | 3/2008 | Abe et al. | |
| 2009/0304084 A1 | 12/2009 | Hallapuro et al. | |
| 2010/0220790 A1 | 9/2010 | Jeon et al. | |
| 2011/0211640 A1 | 9/2011 | Kim et al. | |
| 2011/0317930 A1 | 12/2011 | Kim et al. | |
| 2012/0263231 A1 | 10/2012 | Zhou | |
| 2013/0188716 A1 | 7/2013 | Seregin et al. | |
| 2013/0279819 A1 | 10/2013 | Kim et al. | |
| 2013/0329805 A1 | 12/2013 | Kondo et al. | |

FOREIGN PATENT DOCUMENTS

| | | |
|---|---|---|
| JP | 2010-10950 | 1/2010 |
| WO | 2009/051419 | 4/2009 |
| WO | 2009/115901 | 9/2009 |
| WO | 2010/085064 | 7/2010 |

OTHER PUBLICATIONS

ISO/IEC 14496-10 (MPEG-4 Part10: Advanced Video Coding), dated Oct. 1, 2004.
ByeongMoon Jeon et al., "Description of video coding technology proposal by LG Electronics", Joint Collaborative Team on Video Coding (JCT-VC) of ITU-T SG16 WP3 and ISO/IEC JTC1/SC29/WG11, JCTVC-A110, 1st Meeting: Dresden, DE, Apr. 15-23, 2010, p. 1-37.

Kazushi Sato, "On Motion Vector Coding", Joint Collaborative Team on Video Coding (JCT-VC) of ITU-T SG16 WP3 and ISO/IEC JTC1/SC29/WG11, JCTVC-B081, 2nd Meeting: Geneva, CH, Jul. 21-28, 2010, p. 1-9.
"Test Model under Consideration", Joint Collaborative Team on Video Coding (JCT-VC) of ITU-T SG16 WP3 and ISO/IEC JTC1/SC29/WG11, JCTVC-B205, 2nd Meeting: Geneva, CH, Jul. 21-28, 2010, p. 1-30, 36-39.
Tomoyuki Yamamoto, "A new scheme for motion vector predictor encoding", ITU-Telecommunications Standardization Sector Study Group 16 Question 6 Video Coding Experts Group (VCEG), VCEG-AF13, 32nd Meeting: San Jose, CA, USA, Apr. 20-21, 2007, p. 1-4.
Joel Jung et al., "Competition-Based Scheme for Motion Vector Selection and Coding", ITU-Telecommunications Standardization Sector Study Group 16 Question 6 Video Coding Experts Group (VCEG), VCEG-AC06, 29th Meeting: Klagenfurt, Austria, Jul. 17-18, 2006, pp. 1-7.
Takeshi Chujoh et al., Description of video coding technology proposal by Toshiba, Joint Collaborative Team on Video Coding (JCT-VC) of ITU-T SG16 WP3 and ISO/IEC JTC1/SC29/WG11, 1st Meeting: Dresden, DE, Apr. 15-23, 2010, JCTVC-A117r1, pp. 1-40.
Office Action dated Jan. 17, 2014 in U.S. Appl. No. 13/949,620.
Extended European Search Report dated Mar. 28, 2014 in corresponding European Application No. 11826583.4.
"Test Model under Consideration", 2. JCT-VC Meeting; Jul. 21, 2010-Jul. 28, 2010, Geneva, (Joint Collaborative Team on Video Coding of ISO/IEC JTC1/SC29/WG11 and ITU-T SG.16), URL:http://wftp3.itu.int/av-arch/jctvc-site/, No. JCTVC-B205, Jul. 28, 2010, XP030007704, ISSN: 0000-0046, pp. 31-35 and 40-152.
J. Jung et al., "RD-Optimized Competition Scheme for Efficient Motion Prediction", Proceedings of SPIE, SPIE-International Society for Optical Engineering, US, vol. 6508, Jan. 29, 2007, pp. 650815-1, XP002468795, ISSN: 0277-786X, DOI: 10.1117/12.714374.
Joel Jung et al., "Competition based motion vector prediction—new results", ITU-T Draft, Study Period 2005-2008, International Telecommunication Union, Geneva, CH, vol. 6/16 (WP 3/16), Nov. 1, 2006, pp. 1-8, XP017560195, [retrieved on Apr. 4, 2007].
Guillaume Laroche et al., "RD Optimized Coding for Motion Vector Predictor Selection", IEEE Transactions on Circuits and Systems for Video Technology, IEEE Service Center, Piscataway, NJ, US, vol. 18, No. 9, Sep. 1, 2008, pp. 1247-1257, XP011231739, ISSN: 1051-8215, DOI: 10.1109/TCSVT.2008.928882.
Kazushi Sato, "On Motion Vector Coding", 2. JCT-VC Meeting, Jul. 21, 2010-Jul. 28, 2010, Geneva, (Joint Collaborative Team on Video Coding of ISO/IEC JTC1/SC29/WG11 and ITU-T SG.16), URL:http://wftp3.itu.int/av-arch/jctvc-site/, No. JCTVC-B081, Jul. 20, 2010, XP030007661, ISSN: 0000-0046.
Office Action and search report dated May 8, 2014 in corresponding Singapore Application No. 2013011200.
"Test Model under Consideration", Output Document (draft000), Joint Collaborative Team on Video Coding (JCT-VC) of ITU-T SG16 WP3 and ISO/IEC JTC1/SC29/WG11, JCTVC-B205, 2nd Meeting, Geneva, CH, Jul. 21-28, 2010.
Office Action and Search Report dated Jul. 3, 2015 in corresponding Chinese Application No. 201180036996.6 (with partial English translation).
Communication Pursuant to Article 94(3) EPC dated Jan. 17, 2017 in corresponding European Application No. 11826583.4.

* cited by examiner

FIG. 4B

Example header syntax mv_competition_flag
if( mv_competition_flag ) {
    mv_competition_skip_flag
}

FIG. 6

Example prediction unit block syntax

```
if( slice_type != I )
    skip_flag
if( slice_flag ) {
    if( mv_competition_flag ) {
        if ( mv_competition_skip_flag ) {
            if( inter_pred_idc != Pred_L1 && NumMVPCand( L0 ) >
1)
                mvp_idx_l0        ← L0-direction motion vector predictor index
            if( inter_pred_idc != Pred_L0 && NumMVPCand( L1 ) >
1)
                mvp_idx_l1        ← L1-direction motion vector predictor index
        }
    }
}
```

FIG. 11A

Example header syntax mv_competition_flag
mv_competition_skip_flag

FIG. 11B

Example prediction unit block syntax

```
if( slice_type !=I )
   skip_flag
if( slice_flag ) {
  if ( mv_competition_skip_flag ) {
     if( inter_pred_idc != Pred_L1 && NumMVPCand( L0 ) > 1 )
   mvp_idx_l0
     if( inter_pred_idc != Pred_L0 && NumMVPCand( L1 ) > 1)
   mvp_idx_l1
  }
}
```

FIG. 12

Example header syntax mv_competition_flag
if( mv_competition_flag ) {
mv_competition_direct_flag
}

Example prediction unit block syntax if( PreMpde == MODE_DIRECT ) {
if ( mv_competition_flag ) {
if ( mv_competition_direct_flag ) {
if( inter_pred_idc != Pred_L1 && NumMVPCand( L0 ) > 1)
mvp_idx_l0
if( inter_pred_idc != Pred_L0 && NumMVPCand( L1 ) > 1)
mvp_idx_l1
}
}

L0-direction motion vector predictor index

L1-direction motion vector predictor index

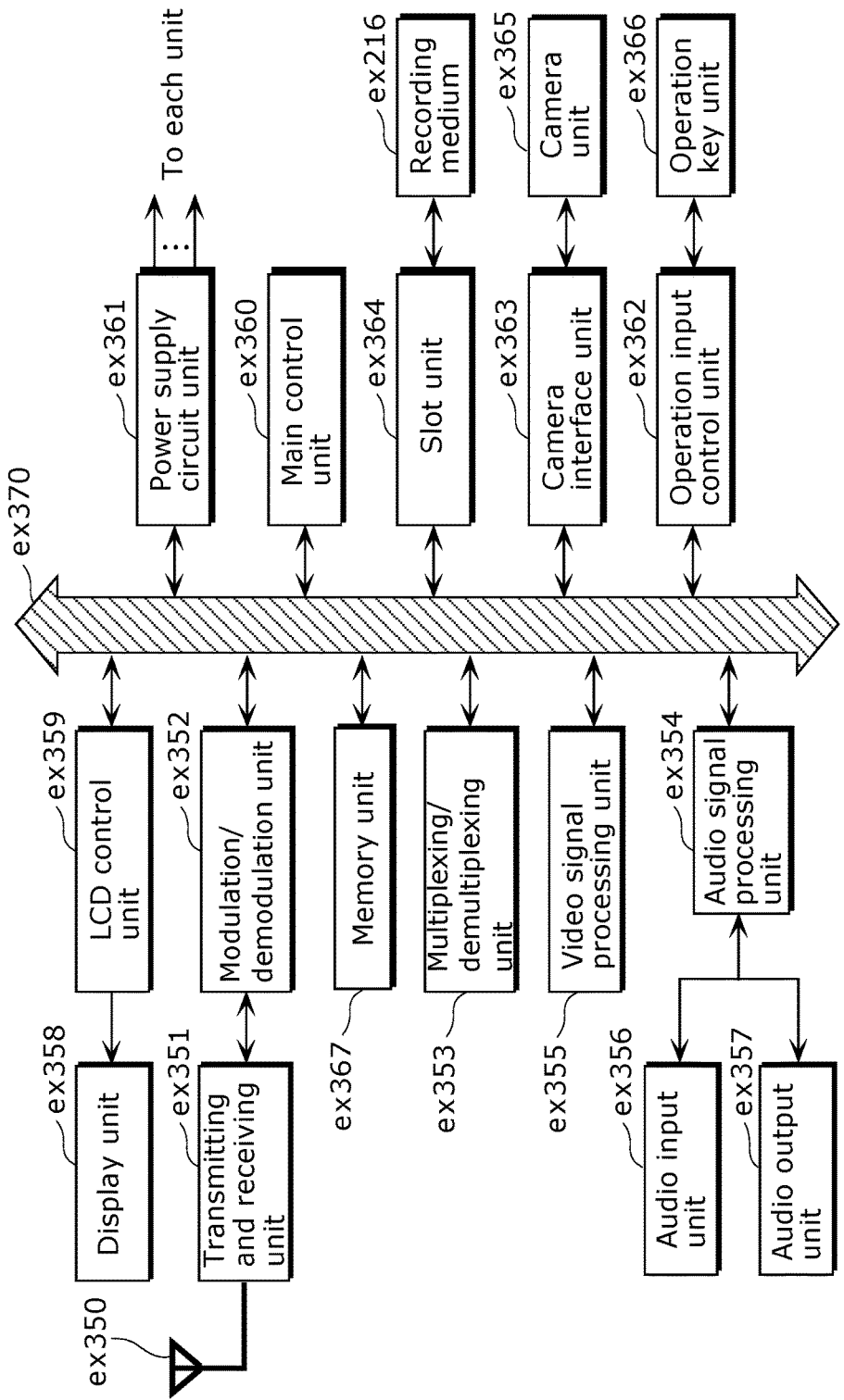

FIG. 19

Video stream (PID=0x1011, Primary video)
Audio stream (PID=0x1100)
Audio stream (PID=0x1101)
Presentation graphics stream (PID=0x1200)
Presentation graphics stream (PID=0x1201)
Interactive graphics stream (PID=0x1400)
Video stream (PID=0x1B00, Secondary video)
Video stream (PID=0x1B01, Secondary video)

FIG. 22
Stream of TS packets
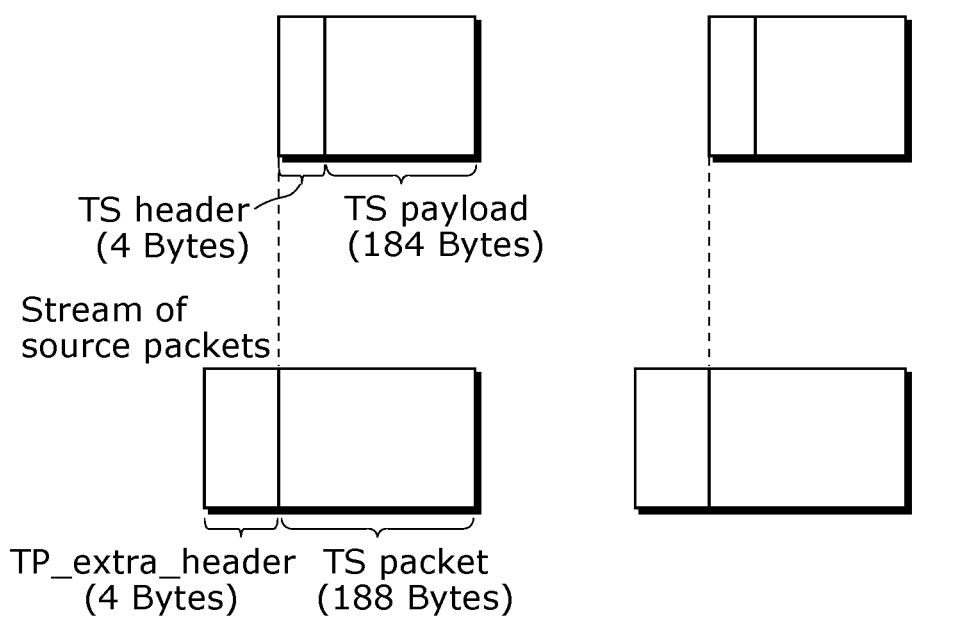
TS header (4 Bytes)   TS payload (184 Bytes)
Stream of source packets
TP_extra_header (4 Bytes)   TS packet (188 Bytes)
Multiplexed data
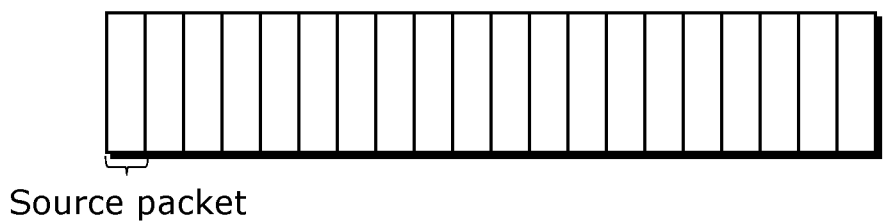
Source packet

FIG. 30

| Corresponding standard | Driving frequency |
|---|---|
| MPEG-4 AVC | 500 MHz |
| MPEG-2 | 350 MHz |
| ⋮ | ⋮ | ex900 ex1000

| Motion vector predictor index | Motion vector predictor candidate |
|---|---|
| 0 | Median (MV_A, MV_B, MV_C) |
| 1 | MV_A |
| 2 | MV_B |
| 3 | MV_C |

FIG. 36 PRIOR ART

Example of conventional syntax
of prediction unit block

```
if( slice_type !=I )
   skip_flag
if( slice_flag ) {
   if (mv_competition_flag ) {
      if( inter_pred_idc != Pred_L1 && NumMVPCand( L0 ) > 1
)
   mvp_idx_l0
      if( inter_pred_idc != Pred_L0 && NumMVPCand( L1 ) >
1)
   mvp_idx_l1
   }
}
```

IMAGE CODING METHOD, IMAGE DECODING METHOD, IMAGE CODING APPARATUS, AND IMAGE DECODING APPARATUS

CROSS REFERENCE TO RELATED APPLICATIONS

This application is a continuation of application Ser. No. 15/445,295, filed Feb. 28, 2017, which is a continuation of application Ser. No. 15/170,223, filed Jun. 1, 2016, now U.S. Pat. No. 9,621,915, which is a continuation of application Ser. No. 14/447,970, filed Jul. 31, 2014, now U.S. Pat. No. 9,392,298, which is a continuation of application Ser. No. 13/816,370, filed Feb. 11, 2013, now U.S. Pat. No. 8,848,805, which is the National Stage of International Application No. PCT/JP2011/005323, filed Sep. 21, 2011, which claims the benefit of U.S. Provisional Patent Application No. 61/386,161, filed Sep. 24, 2010. The entire disclosures of the above-identified applications, including the specifications, drawings and claims, are incorporated herein by reference in their entirety.

TECHNICAL FIELD

The present invention relates to an image coding method, an image decoding method, an image coding apparatus, and an image decoding apparatus which perform prediction coding of moving pictures by selecting, from among motion vector predictor candidates, a most efficient motion vector predictor for coding of a current motion vector to be coded.

BACKGROUND ART

FIG. 32 is a block diagram showing an example configuration of a conventional image coding apparatus that codes moving pictures. A scheme such as H.264 which is an already-standardized moving picture coding scheme is used in the coding of moving pictures (for example, see Non Patent Literature (NPL) 1). In the image coding apparatus in FIG. 32, inter prediction coding is performed by way of an inter prediction control unit 131 controlling an inter prediction unit 112, according to a picture type (for example, the slice type in H.264) determined by a picture type determination unit 124 and a motion vector predictor competition flag (hereafter denoted as "mv_competition_flag") outputted by a motion vector predictor competition flag switching unit 125. Specifically, the inter prediction control unit 131 switches the method of calculating for the motion vector predictor for the motion vector coding to be used in the inter coding of each prediction unit block, according to the picture type, such as a P-picture (for example, the P-slice in H.264) or a B-picture (for example, the B-slice in H.264), and to whether the mv_competition_flag is ON or OFF.

The mv_competition_flag is included in first header information (for example, the slice header in H.264) that is attached to a bitstream on a first processing unit (for example, slice in H.264) basis, and is notified from the image coding apparatus to an image decoding apparatus. When the mv_competition_flag is ON, the image coding apparatus generates, as motion vector predictor candidates, for example, one or more motion vectors used around each prediction unit block, and attaches, to the bitstream, the index number of the motion vector predictor candidate that is ultimately used in the prediction of the motion vector of each prediction unit block. When the mv_competition_flag is OFF, the image coding apparatus generates one motion vector predictor from, for example, motion vectors used around the respective prediction unit blocks, and codes the motion vector using such motion vector predictor.

FIG. 33A shows an example of the motion vector predictor candidate generation by the conventional image coding apparatus when the mv_competition_flag is ON. The image coding apparatus first calculates the neighboring prediction unit blocks located left (neighboring block A), above (neighboring block B), and to the upper right (neighboring block C) of the prediction unit block, and calculates each of motion vectors MV_A, MV_B, and MV_C. Next, the image coding apparatus calculates a median motion vector Median (MV_A, MV_B, MV_C) using an intermediate value of the respective components of the motion vectors MV_A, MV_B, MV_C, and attaches a motion vector predictor index 0 to the median motion vector Median (MV_A, MV_B, MV_C). Furthermore, the image coding apparatus attaches motion vector predictor indices 1, 2, and 3 to the respective motion vectors in the order of MV_A, MV_B, and MV_C. FIG. 33B is a table showing the correspondence relationship between the motion vector predictor indices and the motion vector predictor candidates. The image coding apparatus selects the most efficient motion vector predictor candidate for the coding of the motion vector of the current prediction block to be coded, and attaches the index number of the selected motion vector predictor candidate to the bitstream. Furthermore, when all the motion vector predictor candidates are vectors having the same value, and so on, the image coding apparatus reduces the number of candidates by merging vectors, and performs processing such as not attaching a motion vector predictor index to the bitstream when the final number of candidates is 1.

FIG. 34 is a block diagram showing an example configuration of an image decoding apparatus corresponding to the conventional image coding apparatus in FIG. 32. A scheme such as H.264 which is an already-standardized moving picture decoding scheme is used in the decoding of moving pictures. In the image decoding apparatus in FIG. 34, inter prediction decoding is performed by way of an inter prediction control unit 231 controlling an inter prediction unit 212, according to the mv_competition_flag attached to the bitstream, and the motion vector predictor index.

CITATION LIST

Non Patent Literature

[NPL 1] ISO/IEC 14496-10 "MPEG-4 Part 10 Advanced Video Coding"

SUMMARY OF INVENTION

Technical Problem

In the conventional image coding apparatus and image decoding apparatus, when the mv_competition_flag is ON, it is necessary to attach the motion vector predictor index to the bitstream when the number of motion vector predictor candidates is greater than or equal to two, even when skip block processing (for example, P-Skip, B-Skip in H.264) is to be performed on the current prediction block to be coded (FIG. 35, FIG. 36).

As such, there occurs the problem in which, even in the case of coding which targets low bit rate for example, the amount of code to be generated for the motion vector predictor index cannot be changed using a coding mode such as skip block and so on.

The present invention is conceived in order to solve the aforementioned problem and has as an object to provide an image coding method, and so on, that allows the amount of code to be generated for the motion vector predictor index to be changed.

Solution to Problem

An image coding method according to an aspect of the present invention is an image coding method for performing prediction coding of moving pictures, the image coding method including: generating a first flag indicating whether or not a motion vector predictor is to be selected from among one or more motion vector predictor candidates; generating a second flag indicating whether or not a motion vector predictor is to be selected from among the one or more motion vector predictor candidates in coding a current block to be coded in a predetermined coding mode, when the first flag indicates that a motion vector predictor is to be selected; and generating a coded signal in which the first flag and the second flag are included in header information, when the first flag indicates that a motion vector predictor is to be selected.

According to such a configuration, the amount of code to be generated for the motion vector predictor index can be controlled depending on the coding mode.

Specifically, it is possible to (i) generate a coded signal in which the first flag and the second flag are included in the header information of the coded signal when the first flag indicates that a motion vector predictor is to be selected, and (ii) generate a coded signal in which the second flag is not included in the header information when the first flag indicates that a motion vector predictor is not to be selected. By not including the second flag, the amount of code to be generated for the motion vector predictor index can be changed.

With this, the skip block motion vector predictor competition flag (second flag) can be controlled. For example, in the case of coding which targets low bit rate, by setting only the skip block motion vector predictor competition flag to OFF, the amount of code to be generated for the skip block motion vector predictor competition flag can be reduced, and thus image quality breakdown can be suppressed.

An image decoding method according to an aspect of the present invention is an image decoding method for decoding a coded signal generated by prediction coding of moving pictures, the image decoding method including: decoding a first flag included in header information of the coded signal and indicating whether or not a motion vector predictor is to be selected from among one or more motion vector predictor candidates; and decoding a second flag included in the header information, when the first flag indicates that a motion vector predictor is to be selected, the second flag indicating whether or not a motion vector predictor is to be selected from among the one or more motion vector predictor candidates in decoding a current block to be decoded in a predetermined decoding mode.

Such a configuration enables the decoding of a coded signal for which the amount of code to be generated for the motion vector predictor index is controlled depending on the coding mode.

It should be noted that the present invention can be realized not only as an image coding method or image decoding method which includes such characteristic steps, but also as an image coding apparatus or image decoding apparatus that includes, as processing units, the characteristic steps included in the image coding method or image decoding method. Furthermore, the present invention can also be realized as a program for causing a computer to execute the characteristic steps included in the image coding method or image decoding method. In addition, the present invention can also be realized as a program for causing a computer to function as the characteristic processing units included in the image coding apparatus or image decoding apparatus. Moreover, it should be obvious that such a computer can be distributed via a computer-readable non-transitory recording medium such as a Compact Disc-Read Only Memory (CD-ROM) and so on, or a communication network such as the Internet, and so on.

Advantageous Effects of Invention

According to the present invention, it is possible to provide an image coding method, and so on, that allows the amount of code to be generated for the motion vector predictor index to be changed.

BRIEF DESCRIPTION OF DRAWINGS

FIG. 4B is a diagram showing an example of syntax of a header.

FIG. 6 is a diagram showing an example of syntax of a prediction unit block.

FIG. 11A is a diagram showing another example of syntax of a header.

FIG. 11B is a diagram showing another example of syntax of a prediction unit block.

FIG. 12 is a diagram showing an example of syntax of a prediction unit block.

FIG. 18B is a block diagram showing an example of a configuration of a cellular phone.

FIG. 19 is a diagram showing a structure of multiplexed data.

FIG. 22 is a diagram showing a structure of TS packets and source packets in the multiplexed data.

FIG. 30 is a diagram showing an example of a look-up table in which video data standards are associated with driving frequencies.

FIG. 36 is a diagram showing a conventional syntax of a prediction unit block.

DESCRIPTION OF EMBODIMENTS

Hereinafter, embodiments of the present invention shall be described in detail with reference to the Drawings. It is to be noted that the each of the embodiments described below shows a preferred specific example of the present invention. The numerical values, shapes, structural elements, the arrangement and connection of the structural elements, steps, the processing order of the steps etc. shown in the following exemplary embodiments are mere examples, and are not intended to limit the present invention. The present invention is only limited by the Claims. Therefore, among the structural elements in the following exemplary embodiments, structural elements not recited in any one of the independent claims defining the most generic concept of the present invention are not necessarily required to solve the problem to be solved by the present invention and are described as structural elements making up more preferable form.

Hereinafter, embodiments of the present invention shall be described with reference to the Drawings.

[Embodiment 1]

Figure 1:
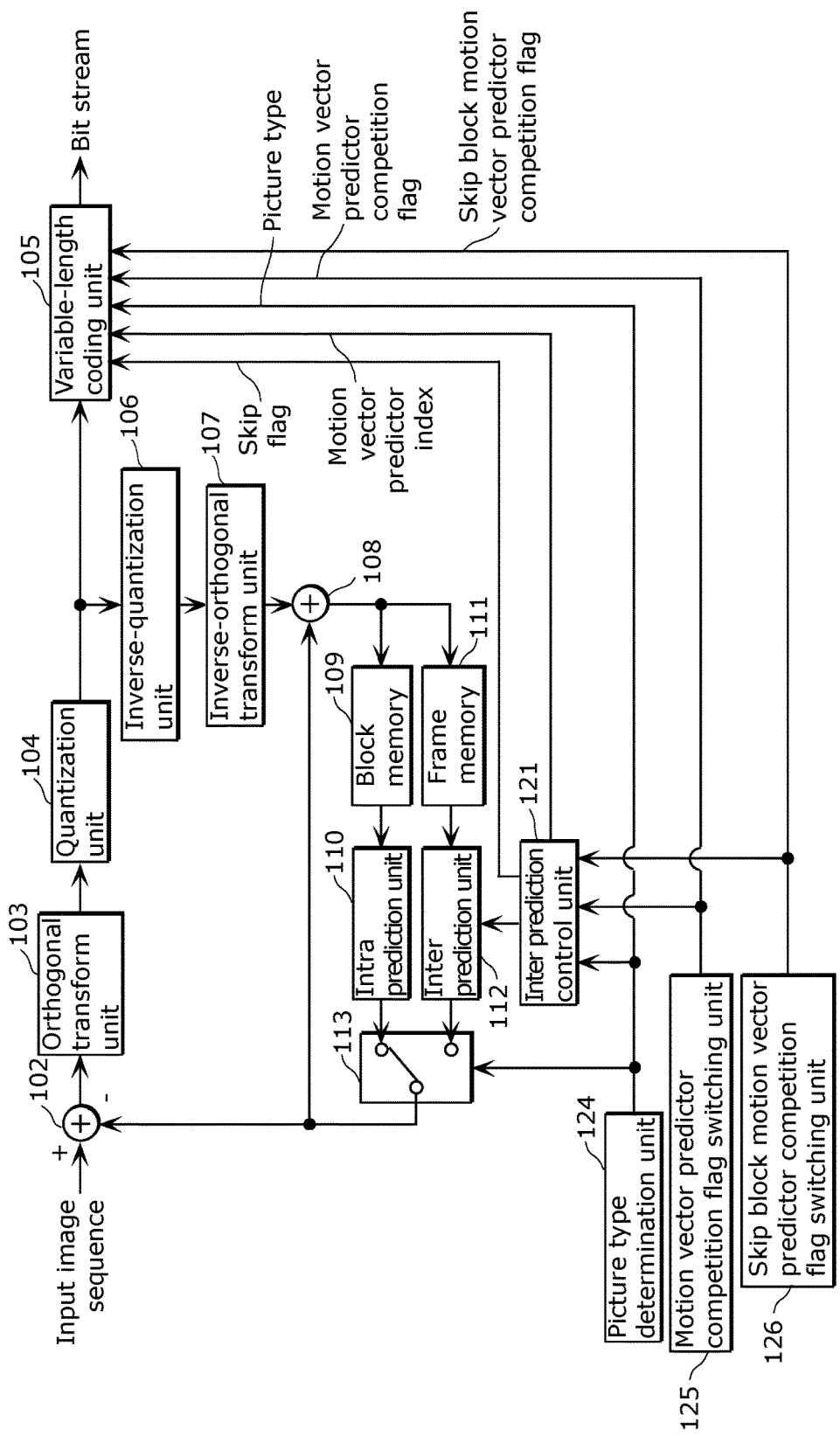
FIG. 1 is a block diagram showing an example configuration of an image coding apparatus according to Embodiment 1 of the present invention.
Figure 32:
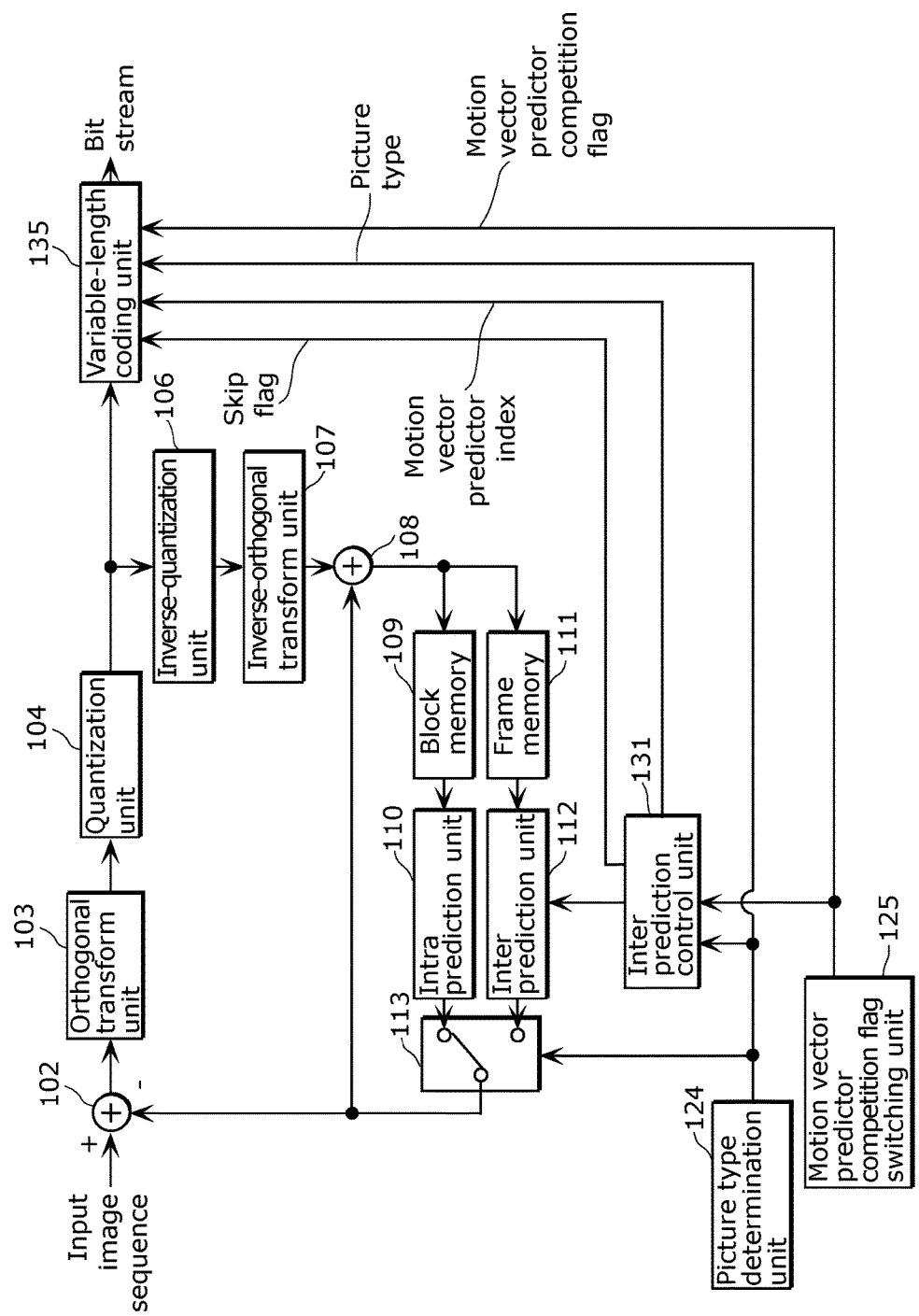
FIG. 32 is a block diagram showing an example configuration of a conventional image coding apparatus.
Figures 33A, 33B:
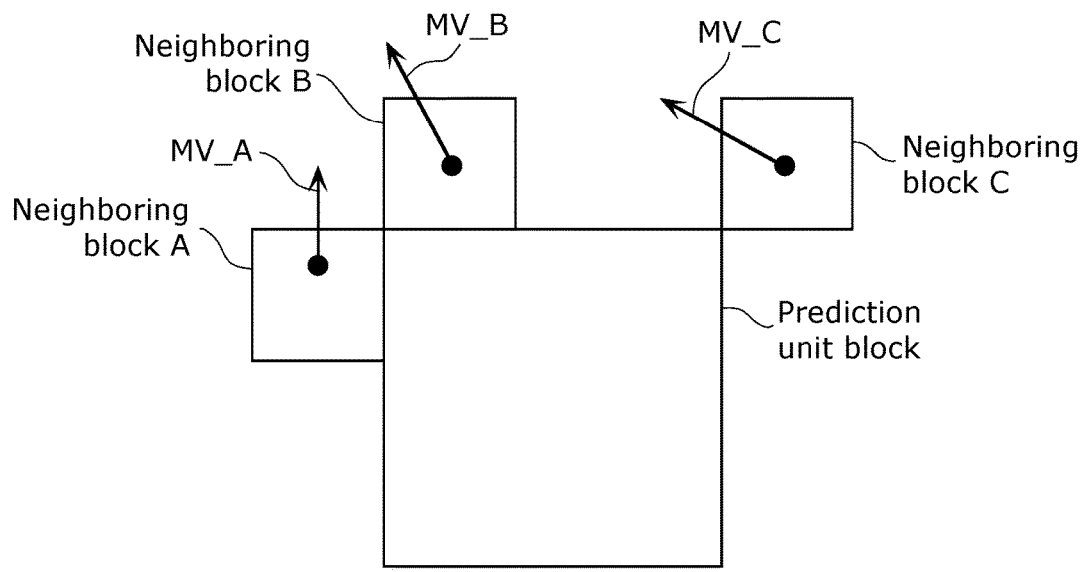
FIG. 33A is a conceptual diagram illustrating conventional motion vector predictor candidate generation.
FIG. 33B is a table showing the correspondence relationship between motion vector predictor indices and motion vector predictor candidates.

FIG. 1 is a block diagram showing an example configuration of an image coding apparatus according to Embodiment 1 of the present invention. The image coding apparatus in FIG. 1 is different from the conventional image coding apparatus shown in FIG. 32 in including a skip block motion vector predictor competition flag switching unit 126 and in attaching a skip block motion vector predictor competition flag (hereafter denoted as "mv_competition_skip_flag") to a bitstream.

In the image coding apparatus in FIG. 1, the mv_competition_skip_flag is notified, to an image decoding apparatus, in a header (for example, the slice header in H.264) that is attached on a per picture basis. It should be noted that the mv_competition_skip_flag need not necessarily be notified in the header attached on a per picture basis, and may be notified in a header (for example, the sequence parameter set in H.264) attached to each of units made up of plural pictures, or in header information (for example, the picture parameter set in H.264) that can be used in common for plural pictures.

The image coding apparatus shown in FIG. 1 includes: a subtractor 102, an orthogonal transform unit 103, a quantization unit 104, a variable-length coding unit 105, an inverse-quantization unit 106, an inverse-orthogonal transform unit 107, an adder 108, a block memory 109, an intra prediction unit 110, a frame memory 111, an inter prediction unit 112, a switch 113, an inter prediction control unit 121, a picture type determination unit 124, a motion vector predictor competition flag switching unit 125, and the skip block motion vector predictor competition flag switching unit 126.

The subtractor 102 subtracts predictive image data from an input image data to output prediction error data. The orthogonal transform unit 103 transforms the prediction error data, from an image domain to a frequency domain. The quantization unit 104 performs quantization on the prediction error data that has been transformed to the frequency domain.

The inverse-quantization unit 106 performs inverse-quantization on the prediction error data that has been quantized by the quantization unit 104. The inverse-orthogonal transform unit 107 transforms the inverse-quantized prediction error data, from the frequency domain to the image domain. The adder 108 adds up the prediction error data and the predictive image data to output reconstructed image data. The block memory 109 stores reconstructed image data on a block basis, and the frame memory 111 stores reconstructed image data on a frame basis.

The intra prediction unit 110 generates predicted image data by intra prediction coding of a current block to be coded, using a block-unit of the reconstructed image data stored in the block memory 109. The inter prediction unit 112 generates predicted image data by inter prediction coding of the current block to be coded, using a frame-unit of the reconstructed image data stored in the frame memory 111 and a motion vector derived by motion estimation. The switch 113 switches the coding mode between intra prediction and inter prediction.

The picture type determination unit 124 determines which picture type, among the I-picture, B-picture, or P-picture, an input image sequence is to be coded as, and generates picture type information.

The motion vector predictor competition flag switching unit 125 generates an mv_competition_flag indicating whether or not a motion vector predictor is to be selected from among one or more motion vector predictor candidates.

The skip block motion vector predictor competition flag switching unit 126 generates, when the mv_competition_flag indicates that a motion vector predictor is to be selected, an mv_competition_skip_flag indicating whether or not a motion vector predictor is to be selected from among one or more motion vector predictor candidates when the current block to be coded is coded in a predetermined coding mode.

The inter prediction control unit 121 selects the motion vector predictor from among one or more motion vector predictor candidates.

The variable-length coding unit 105 performs variable-length coding of the quantized prediction error data, the motion vector predictor index, prediction error information (difference vector) of the motion vector predictor candidate, picture type information, and so on. With this, the variable-length coding unit 105 generates a bitstream.

Figure 2:
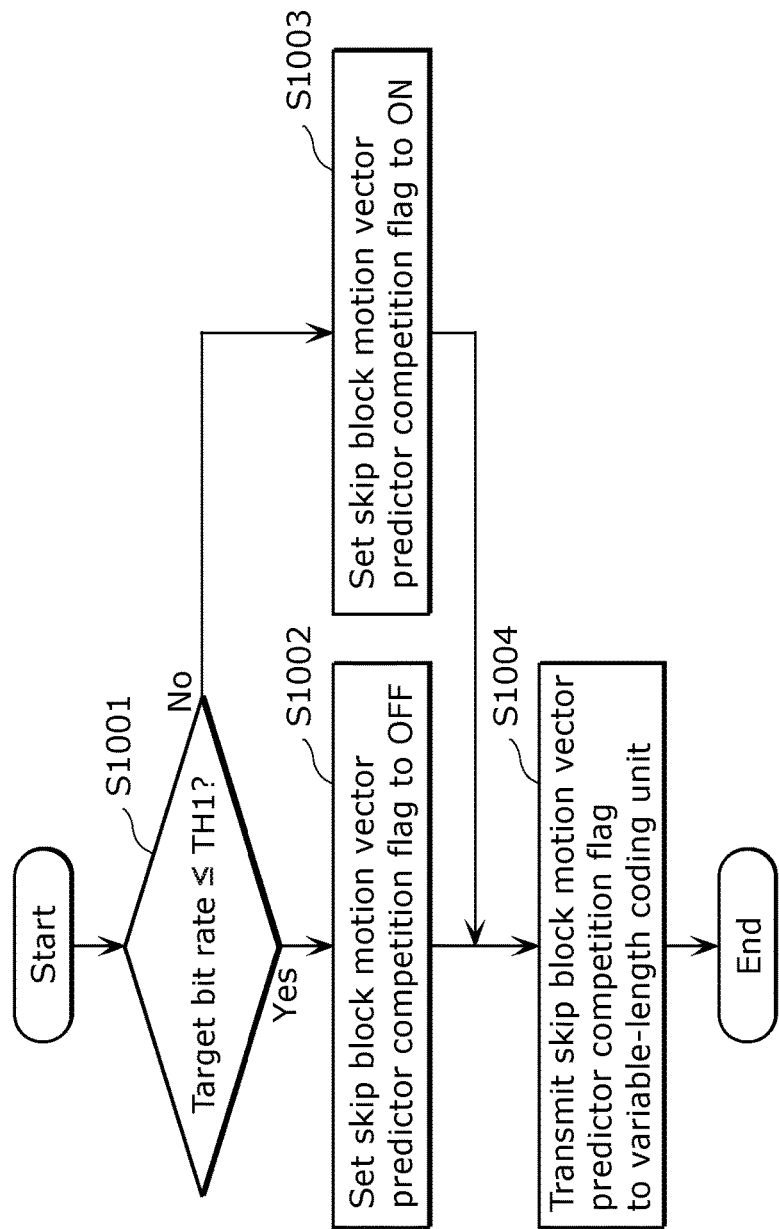
FIG. 2 is a flowchart showing an example of skip block motion vector predictor competition flag switching control by the image coding apparatus.

FIG. 2 shows an example of the operational flow of the skip block motion vector predictor competition flag switching unit 126.

The skip block motion vector predictor competition flag switching unit 126 judges whether or not the target bit rate during coding is less than or equal to a certain value for example (S1001), and sets the mv_competition_skip_flag to OFF (S1002) when the judgment result indicates True (Yes in S1001). When the judgment result indicates False (No in S1001), the skip block motion vector predictor competition flag switching unit 126 sets the mv_competition_skip_flag to ON (S1003). As for the values for indicating ON and OFF, it is possible to set any type of value, such as setting 1 for ON and 0 for OFF, as long as ON (valid) and OFF (invalid) can be distinguished.

The skip block motion vector predictor competition flag switching unit 126 transmits the set mv_competition_skip_flag to the variable-length coding unit 105 in FIG. 1 (S1004), and attaches the mv_competition_skip_flag to the header, and so on, to be attached on a per picture basis.

Although description is carried out above with the target bit rate being used in the ON/OFF control of the mv_competition_skip_flag, the control is not limited to such. For example, control may be based on the size of the quantization parameter, with the mv_competition_skip_flag being set to OFF when the quantization parameter is large and the mv_competition_skip_flag being set to ON when the quantization parameter is small. By adopting such a configuration, the mv_competition_skip_flag can be adaptively controlled according to the value of the quantization parameter, and thus, during coding with a fixed bit rate for example, image quality breakdown can be suppressed by setting the mv_competition_skip_flag OFF when the quantization parameter is greater than or equal to a certain value.

Figure 3:
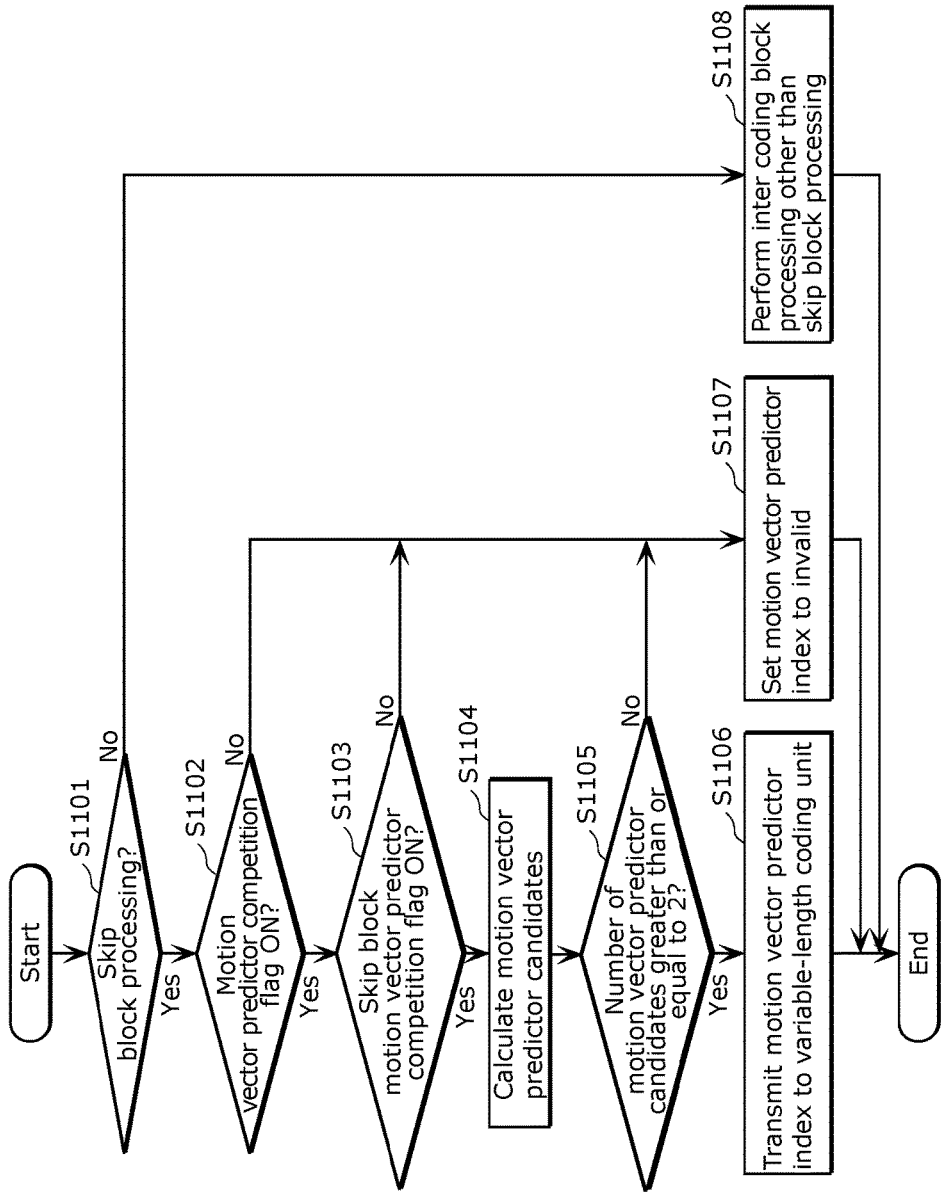
FIG. 3 is a flowchart showing an example of inter prediction control by the image coding apparatus.

Next, an example of the operational flow of the inter prediction control unit 121 in the image coding apparatus in FIG. 1 is shown in FIG. 3.

The inter prediction control unit 121 judges whether or not to perform skip block processing on the current prediction block to be inter coded based on, for example, the target bit rate and the amount of code generated up to the present (S1101), and sets the result to the skip flag and transmits the skip flag to the variable-length coding unit 105.

When the judgment result in step S1101 indicates False (No in S1101), the inter prediction control unit 121 performs an inter coding block processing other than skip block processing (S1108).

When the judgment result in step S1101 indicates True (Yes in S1101), the inter prediction control unit 121 judges whether or not the mv_competition_flag is ON (S1102), and judges whether or not the mv_competition_skip_flag is ON (S1103) when the result indicates True (Yes in S1102). When the judgment result in step S1103 indicates True (Yes in S1103), the inter prediction control unit 121 calculates for motion vector predictor candidates (S1104).

The inter prediction control unit 121 judges whether or not there are two or more motion vector predictor candidates (S1105), and transmits the index of the motion vector predictor used in the coding of the motion vector to the variable-length coding unit 105 (S1106) when the judgment result indicates True (Yes in S1105).

When any of the judgment results in S1102, S1103, and S1105 indicates False (No in S1102, No in S1103, or No in S1105), the inter prediction control unit 121 sets the motion vector predictor index to invalid (S1107), and notifies the variable-length coding unit 105 not to attach the index to the bitstream. The method for setting the motion vector predictor index to invalid may be, for example, setting −1 to the motion vector predictor index. However, any method is acceptable as long as the method conveys that a motion vector predictor index is not to be attached.

Figure 4A:
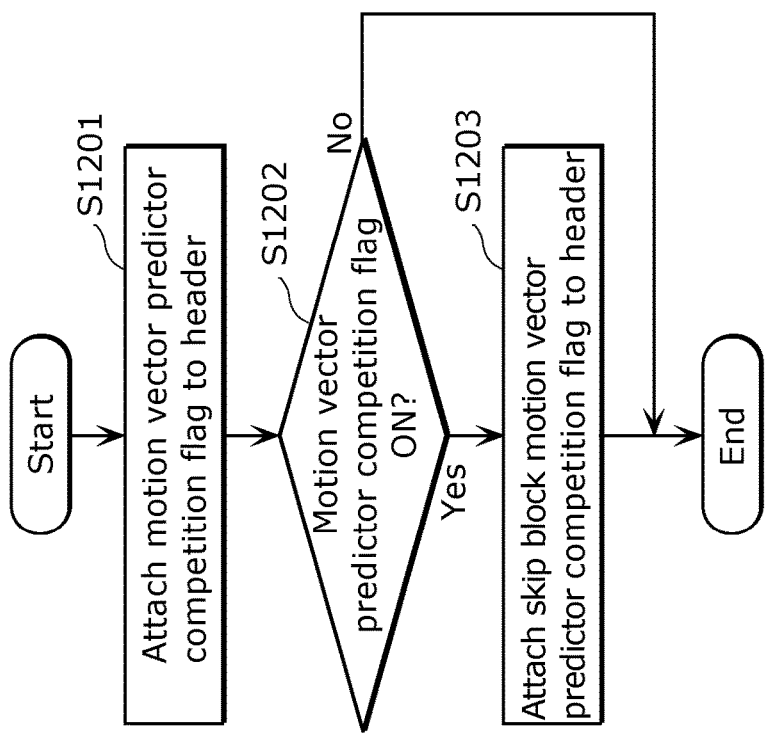
FIG. 4A is a flowchart showing an example of header coding control by a variable-length coding unit.

Next, an example of the operational flow of the header control by the variable-length coding unit 105 of the image coding apparatus in FIG. 1 is shown in FIG. 4A.

The variable-length coding unit 105 first attaches the mv_competition_flag received from the motion vector predictor competition flag switching unit 125 to the header, and so on, to be attached on a per picture basis (S1201), and judges whether or not the mv_competition_flag is ON (S1202). When the mv_competition_flag is ON (Yes in S1202), the variable-length coding unit 105 further attaches the mv_competition_skip_flag to the header (S1203).

When the mv_competition_flag is OFF (No in S1202), the variable-length coding unit 105 does not attach the mv_competition_skip_flag to the header.

With this, the amount of code can be reduced more than when the mv_competition_skip_flag is always attached. An example of the syntax of the header is shown in FIG. 4B.

Figure 5:
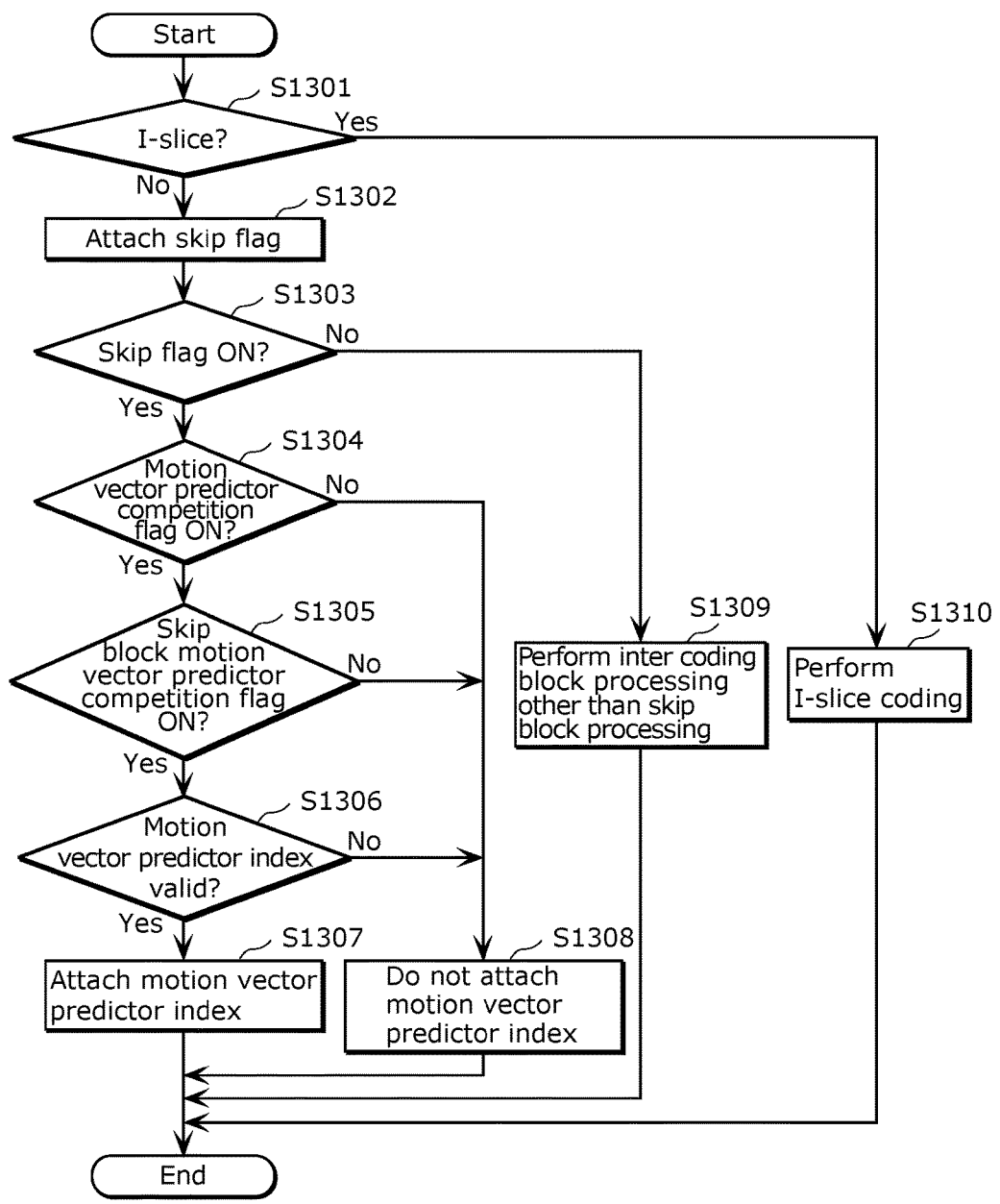
FIG. 5 is a flowchart showing an example of prediction unit block coding control by the variable-length coding unit.

Next, the operational flow of the prediction unit block control by the variable-length coding unit 105 of the image coding apparatus in FIG. 1 is shown in FIG. 5.

The variable-length coding unit 105 first judges whether or not the slice type of the coding target is an I-slice (S1301), and performs coding for an I-slice (S1310) when the slice type is the I-slice (Yes in S1301). When the slice type is not the I-slice (No in S1301), the variable-length coding unit 105 attaches the skip flag received from the inter prediction control unit 121 to the bitstream (S1302).

After the processing in step S1302, the variable-length coding unit 105 judges whether or not the skip flag is ON (S1303). When the skip flag is ON (Yes in S1303), the variable-length coding unit 105 switches to the coding for skip block, and judges whether or not the mv_competition_flag is ON (S1304). When the skip flag is OFF (No in S1303), the variable-length coding unit 105 performs an inter coding block processing other than skip block (S1309).

When the mv_competition_flag is ON (Yes in S1304), the variable-length coding unit 105 next judges whether or not the mv_competition_skip_flag is ON (S1305). When the mv_competition_skip_flag is ON and the motion vector predictor index received from the inter prediction control unit 121 is valid (Yes in S1305, Yes in 1306), the variable-length coding unit 105 attaches the motion vector predictor index to the bitstream (S1307).

When any of the judgment results in steps S1304 to S1306 indicates False, the variable-length coding unit 105 does not attach the motion vector predictor index to the bitstream (S1308).

Accordingly, even when the mv_competition_flag is ON, the motion vector predictor index is not attached to the bitstream when the mv_competition_skip_flag is OFF, and thus the amount of code can be suppressed. An example of the syntax of the prediction unit block is shown in FIG. 6.

Figure 7:
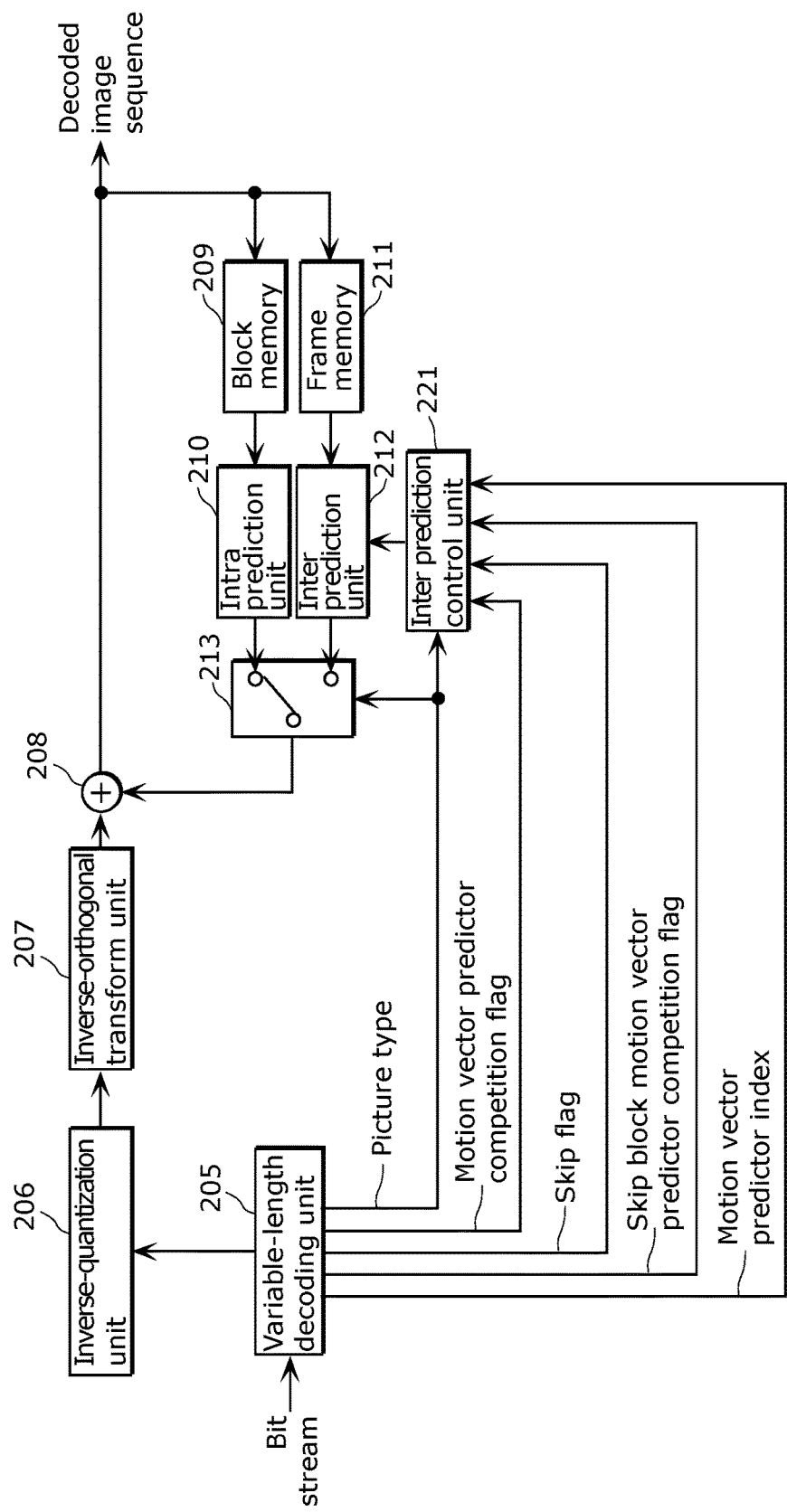
FIG. 7 is a block diagram showing an example configuration of an image decoding apparatus according to Embodiment 1 of the present invention.
Figure 34:
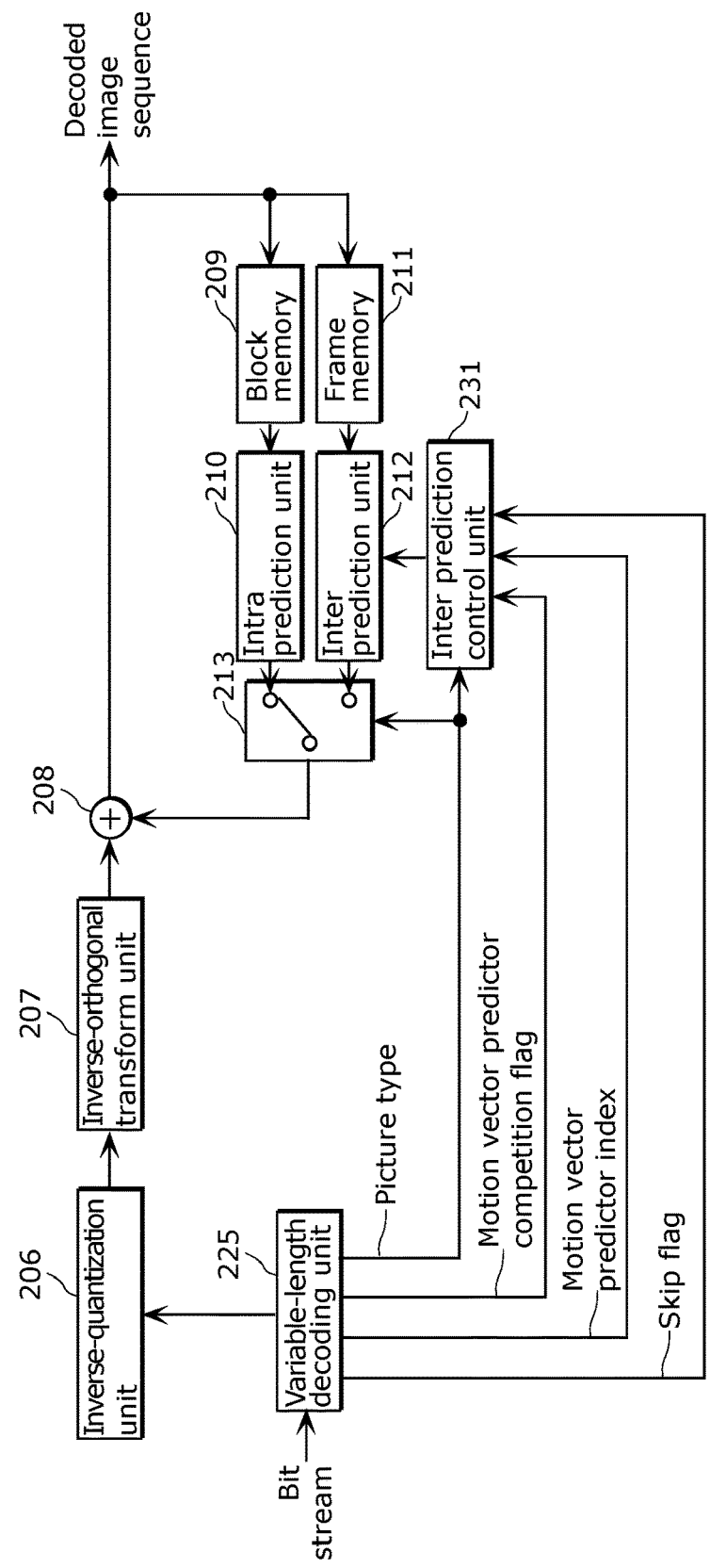
FIG. 34 is a block diagram showing an example configuration of a conventional image decoding apparatus.
Figure 35:
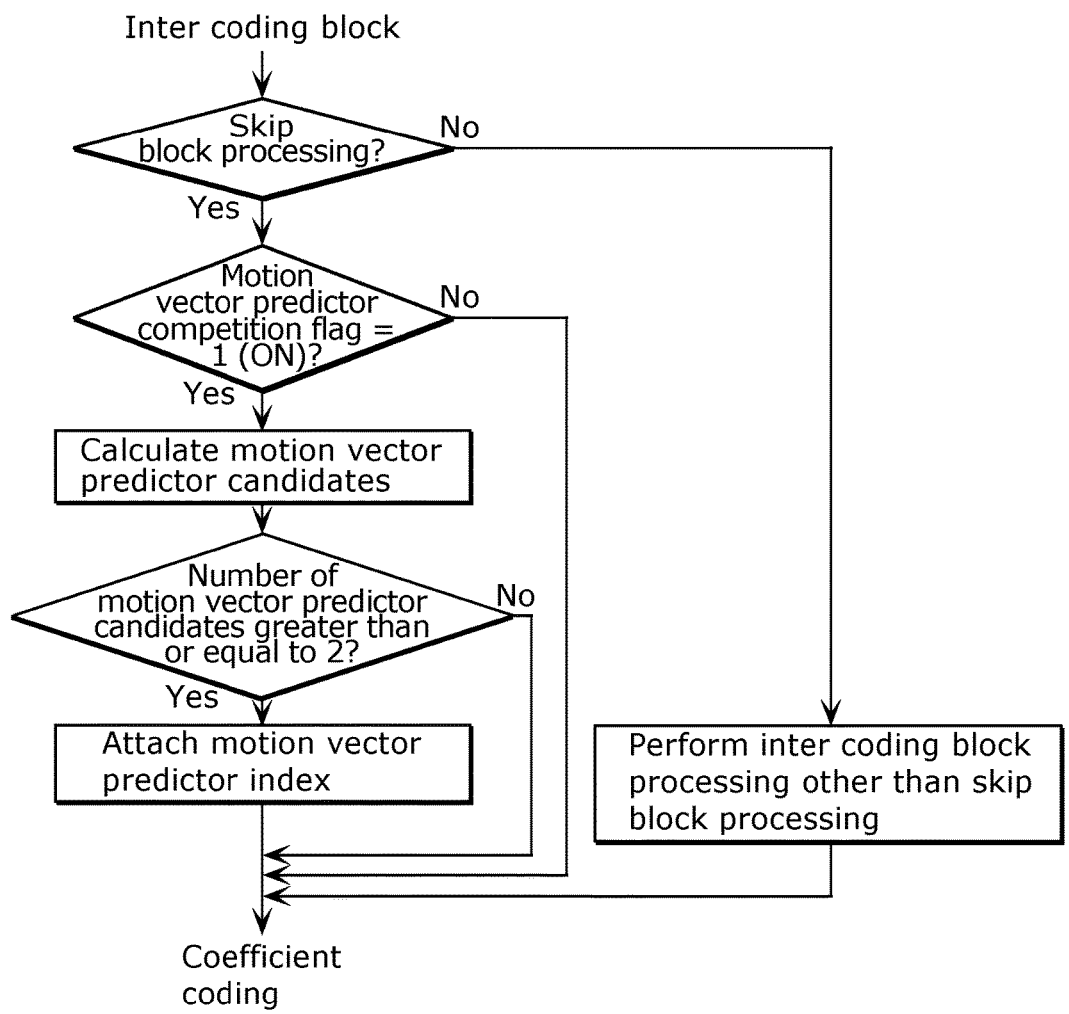
FIG. 35 is a flowchart showing conventional inter prediction control.

FIG. 7 is a block diagram showing an example configuration of an image decoding apparatus corresponding to the image coding apparatus in FIG. 1. The image decoding apparatus in FIG. 7 is different from the conventional image decoding apparatus in FIG. 34 in reading the mv_competition_skip_flag from the bitstream and using the mv_competition_skip_flag in the processing by an inter prediction control unit 221.

The image decoding apparatus shown in FIG. 7 includes a variable-length decoding unit 205, an inverse-quantization unit 206, an inverse-orthogonal transform unit 207, an adder 208, a block memory 209, an intra prediction unit 210, a frame memory 211, and inter prediction unit 212, a switch 213, and the inter prediction control unit 221.

The variable-length decoding unit 205 performs variable-length decoding on an inputted bitstream, and decodes the picture type information, the motion vector predictor index, and the prediction error data. The inverse-quantization unit 206 performs inverse-quantization on the prediction error data. The inverse-orthogonal transform unit 207 transforms the inverse-quantized prediction error data, from the frequency domain to the image domain. The adder 208 generates decoded image data by adding up the predicted image data and the prediction error data.

The block memory 209 stores the decoded image data on a block basis. The frame memory 211 stores the decoded image data on a frame basis.

The intra prediction unit 210 generates predicted image data of the current block to be decoded, by performing intra prediction using a block-unit of the decoded image data stored in the block memory. The inter prediction unit 212 generates predicted image data of the current block to be decoded, by performing inter prediction using a frame-unit of the decoded image data stored in the frame memory. The switch 213 switches the decoding mode between intra prediction and inter prediction.

The inter prediction control unit 221 selects a motion vector predictor from among one or more motion vector predictor candidates. It should be noted that the inter prediction control unit 221 selects a motion vector predictor from the one or more motion vector predictor candidates, using the motion vector predictor index decoded by the variable-length decoding unit 205.

Figure 8:
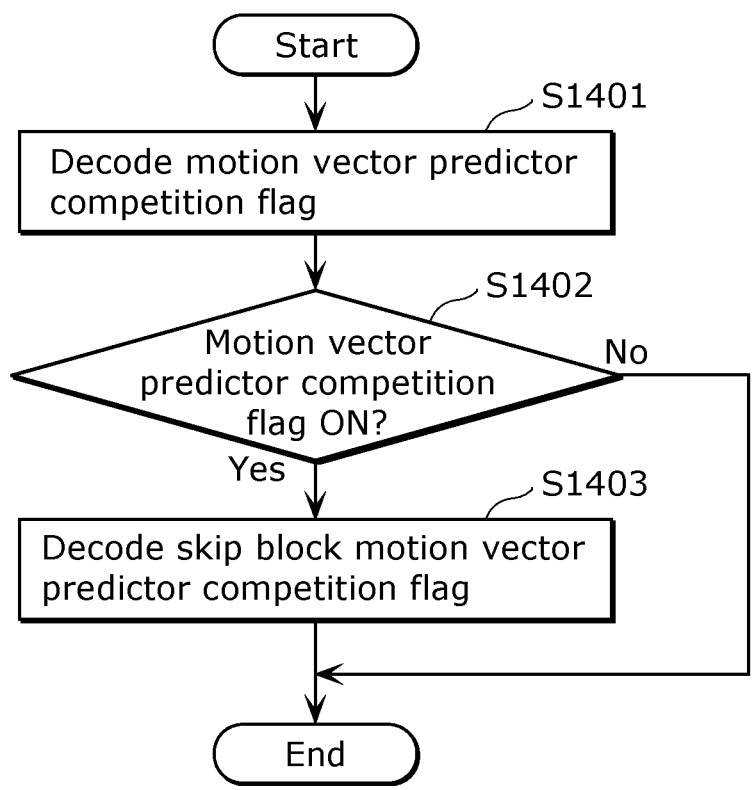
FIG. 8 is a flowchart showing an example of header decoding control by a variable-length decoding unit.

FIG. 8 shows the operational flow of the header control by the variable-length decoding unit 205 of the image decoding apparatus in FIG. 7.

The variable-length decoding unit 205 decodes the mv_competition_flag in the bitstream (S1401), and subsequently decodes the mv_competition_skip_flag when the mv_competition_flag is ON (Yes in S1402).

Figure 9:
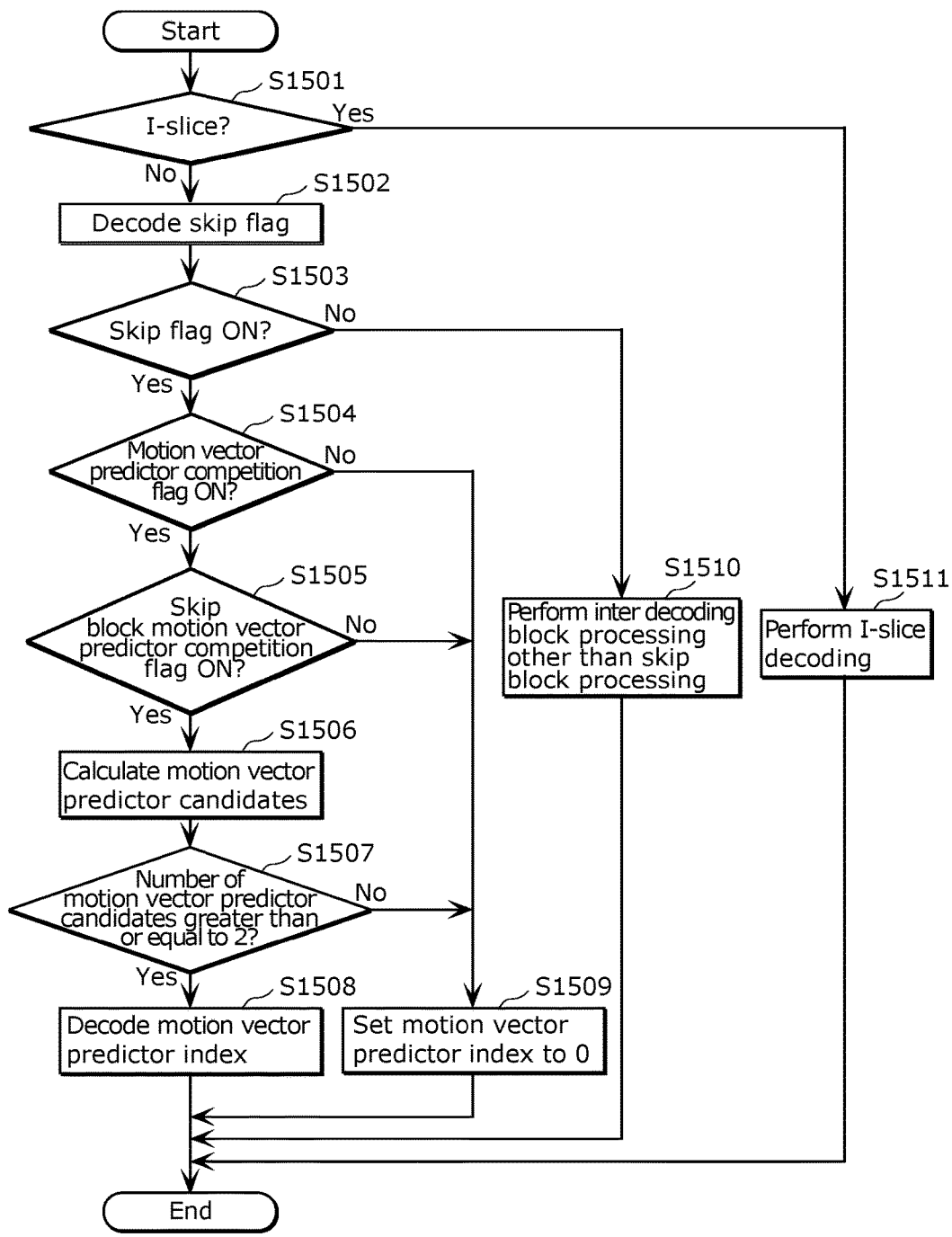
FIG. 9 is a flowchart showing an example of prediction unit block decoding control by the variable-length decoding unit.

FIG. 9 shows the operational flow of the prediction unit block control by the variable-length decoding unit 205 of the image decoding apparatus in FIG. 7.

The variable-length decoding unit 205 judges whether or not the slice type of the decoding target is an I-slice (S1501), and performs decoding for an I-slice (S1511) when the slice type is the I-slice (Yes in S1501). When the slice type is not the I-slice (No in S1501), the variable-length decoding unit 205 decodes the skip flag in the bitstream (S1502).

After the processing in step S1502, the variable-length decoding unit 205 judges whether or not the skip flag is ON (S1503). When the skip flag is ON (Yes in S1503), the variable-length decoding unit 205 switches to the decoding for skip block, and judges whether or not the mv_competition_flag is ON (S1504). When the skip flag is OFF (No in S1503), the variable-length decoding unit 205 performs an inter decoding block processing other than skip block processing (S1510).

When the mv_competition_flag is ON (Yes in S1504), the variable-length decoding unit 205 next judges whether or not the mv_competition_skip_flag is ON (S1505). When the judgment result indicates True (Yes in S1505), the variable-length decoding unit 205 calculates for motion vector predictor candidates (S1506).

The variable-length decoding unit 205 judges whether or not there are two or more motion vector predictor candidates (S1507), and decodes the motion vector predictor index in the bitstream (S1508) when the judgment result indicates True (Yes in S1507).

When any of the judgment results in S1504, S1505, and S1507 indicates False, the variable-length decoding unit 205 sets the motion vector predictor index to 0 (S1509).

Figure 10:
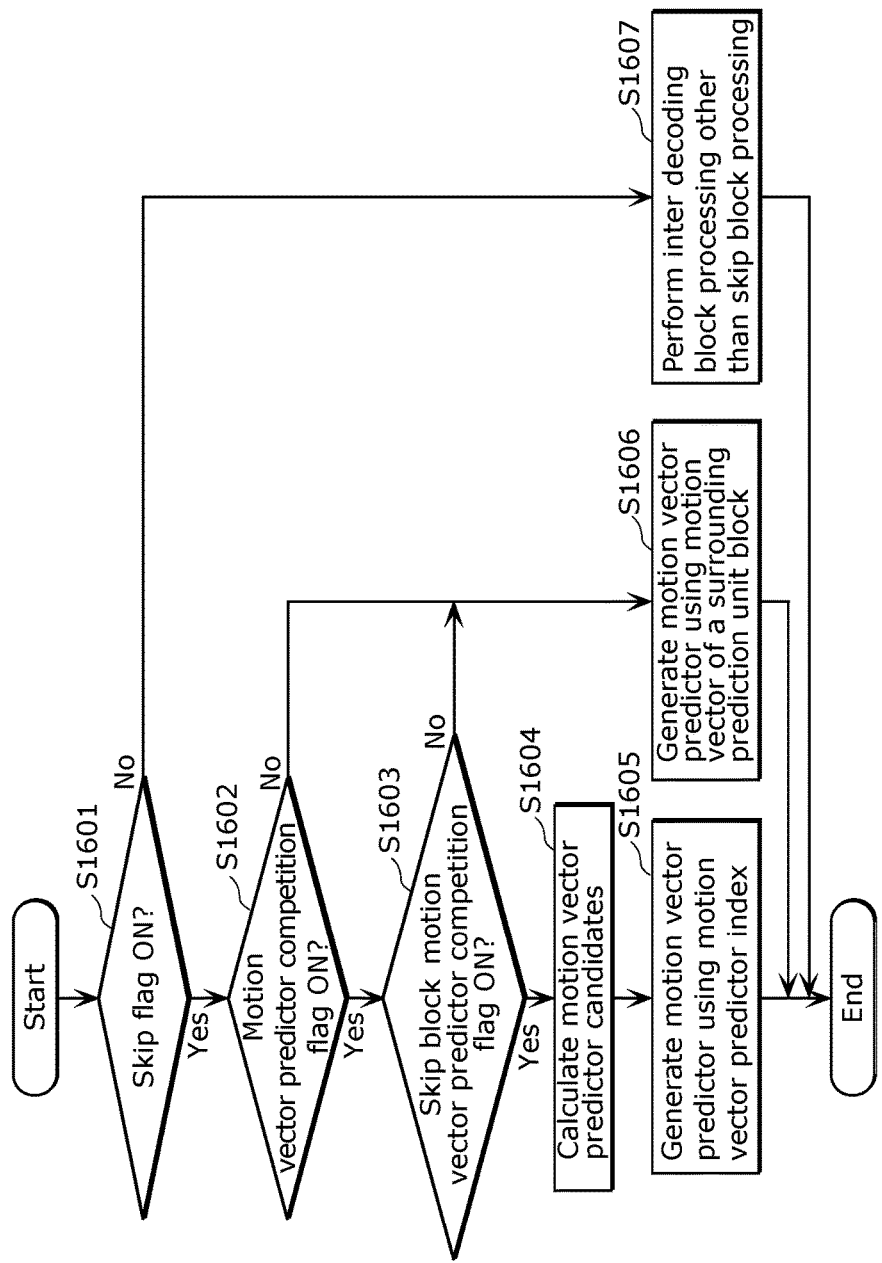
FIG. 10 is a flowchart showing an example of inter prediction control by the image decoding apparatus.

FIG. 10 shows the operational flow of the inter prediction control unit 221 in the image decoding apparatus in FIG. 7.

The inter prediction control unit 221 judges whether or not the skip flag received from the variable-length decoding unit 205 is ON (S1601), and performs an inter decoding block processing other than skip block processing (S1607) when the judgment result indicates False (No in S1601).

When the judgment result in step S1601 indicates True (Yes in S1601), the inter prediction control unit 221 judges whether or not the mv_competition_flag is ON (S1602), and judges whether or not the mv_competition_skip_flag is ON (S1603) when the judgment result indicates True (Yes in S1602).

When the judgment result in step S1603 indicates True (Yes in S1603), the inter prediction control unit 221 calculates for motion vector predictor candidates (S1604), and generates a motion vector predictor using the motion vector predictor index received from the variable-length decoding unit 205 (S1605).

When either of the judgment result in S1602 or S1603 indicates False, the inter prediction control unit 221 generates a motion vector predictor using the motion vectors of surrounding blocks, such as generating, as the motion vector predictor, the average value of motion vectors used around respective prediction unit blocks (S1606).

Although it is described above that motion vector predictor candidates are calculated again in step S1604, it is also acceptable to receive the motion vector predictor candidates calculated by the variable-length decoding unit 205.

It should be noted that although in this embodiment the mv_competition_skip_flag is attached to the bitstream when the mv_competition_flag is ON, as in the syntax in FIG. 4B, it is also acceptable to attach both the mv_competition_flag and the mv_competition_skip_flag to the header as in the syntax in FIG. 11A, and change the syntax of the prediction unit block as in FIG. 11B.

Furthermore, although in this embodiment the mv_competition_flag and the mv_competition_skip_flag are described as being different flags, it is acceptable to represent the mv_competition_flag using 2 bits, with the higher bit representing the original mv_competition_flag and the lower bit representing the mv_competition_skip_flag.

Furthermore, although description is carried out in this embodiment exemplifying the skip block as the coding mode, it is also acceptable, in the coding in direct mode, for the motion vector predictor competition flag during direct mode to be controlled using the same method.

An example of the syntax in such case is shown in FIG. 12. According to the syntax shown in FIG. 12, the motion vector predictor competition flag can be set to OFF during direct mode, and thus the amount of code for the motion vector predictor index can be suppressed.

[Embodiment 2]

The processing described in each of embodiments can be simply implemented in an independent computer system, by recording, in a recording medium, a program for implementing the configurations of the moving picture coding method and the moving picture decoding method described in each of embodiments. The recording media may be any recording media as long as the program can be recorded, such as a magnetic disk, an optical disk, a magnetic optical disk, an IC card, and a semiconductor memory.

Hereinafter, the applications to the moving picture coding method and the moving picture decoding method described in each of embodiments and systems using thereof will be described. The system has a feature of having an image coding and decoding apparatus that includes an image coding apparatus using the image coding method and an image decoding apparatus using the image decoding method. Other configurations in the system can be changed as appropriate depending on the cases.

Figure 13:
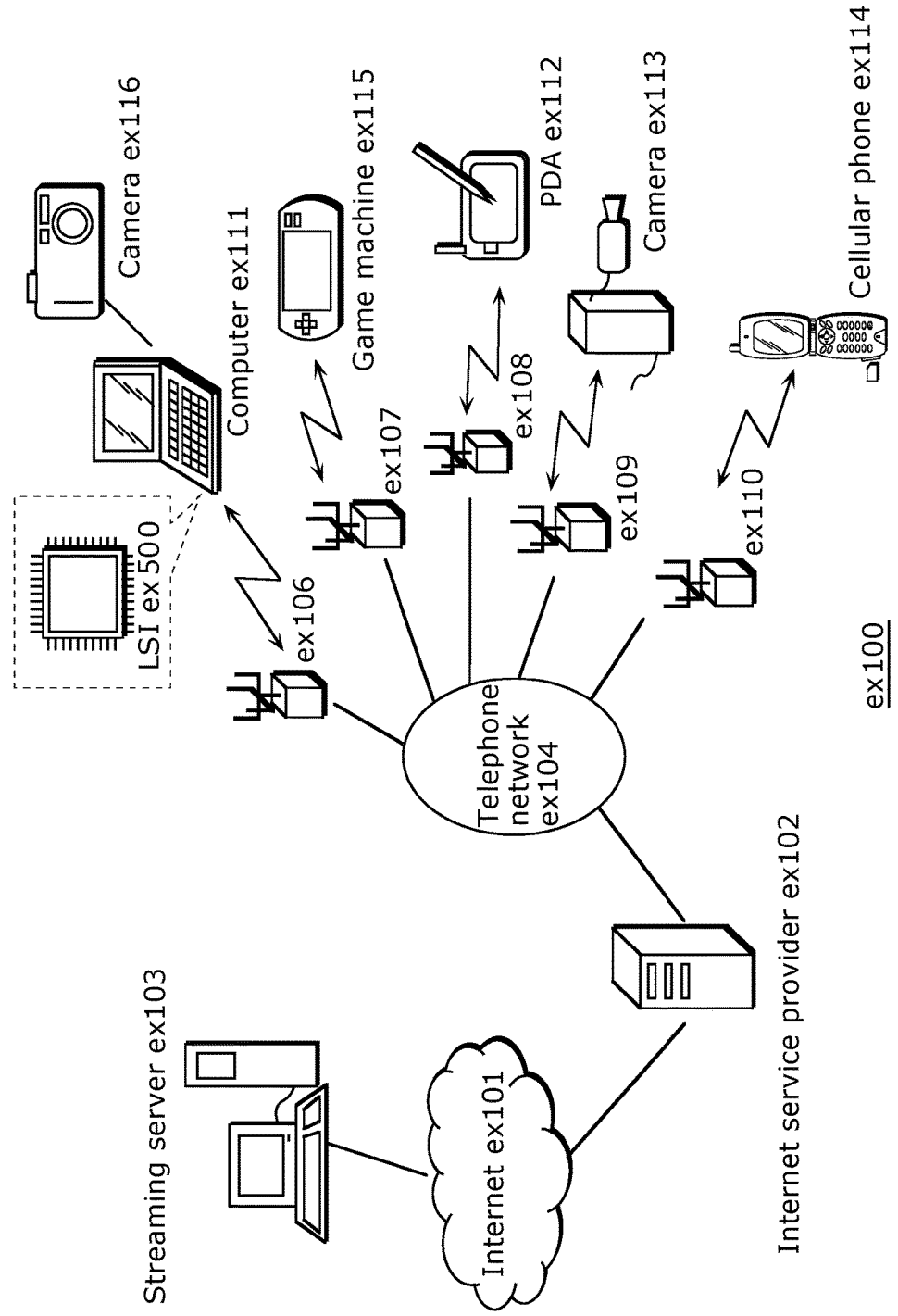
FIG. 13 is a diagram of an overall configuration of a content providing system for implementing content distribution services.

FIG. 13 illustrates an overall configuration of a content providing system ex100 for implementing content distribution services. The area for providing communication services is divided into cells of desired size, and base stations ex106, ex107, ex108, ex109, and ex110 which are fixed wireless stations are placed in each of the cells.

The content providing system ex100 is connected to devices, such as a computer ex111, a personal digital assistant (PDA) ex112, a camera ex113, a cellular phone ex114 and a game machine ex115, via the Internet ex101, an Internet service provider ex102, a telephone network ex104, as well as the base stations ex106 to ex110, respectively.

However, the configuration of the content providing system ex100 is not limited to the configuration shown in FIG. 13, and a combination in which any of the elements are connected is acceptable. In addition, each device may be directly connected to the telephone network ex104, rather than via the base stations ex106 to ex110 which are the fixed wireless stations. Furthermore, the devices may be interconnected to each other via a short distance wireless communication and others.

The camera ex113, such as a digital video camera, is capable of capturing video. A camera ex116, such as a digital camera, is capable of capturing both still images and video. Furthermore, the cellular phone ex114 may be the one that meets any of the standards such as Global System for Mobile Communications (GSM), Code Division Multiple Access (CDMA), Wideband-Code Division Multiple Access (W-CDMA), Long Term Evolution (LTE), and High Speed Packet Access (HSPA). Alternatively, the cellular phone ex114 may be a Personal Handyphone System (PHS).

In the content providing system ex100, a streaming server ex103 is connected to the camera ex113 and others via the telephone network ex104 and the base station ex109, which enables distribution of images of a live show and others. In such a distribution, a content (for example, video of a music live show) captured by the user using the camera ex113 is coded as described above in each of embodiments, and the coded content is transmitted to the streaming server ex103. On the other hand, the streaming server ex103 carries out stream distribution of the transmitted content data to the clients upon their requests. The clients include the computer ex111, the PDA ex112, the camera ex113, the cellular phone ex114, and the game machine ex115 that are capable of decoding the above-mentioned coded data. Each of the devices that have received the distributed data decodes and reproduces the coded data.

The captured data may be coded by the camera ex113 or the streaming server ex103 that transmits the data, or the coding processes may be shared between the camera ex113 and the streaming server ex103. Similarly, the distributed data may be decoded by the clients or the streaming server ex103, or the decoding processes may be shared between the clients and the streaming server ex103. Furthermore, the data of the still images and video captured by not only the camera ex113 but also the camera ex116 may be transmitted to the streaming server ex103 through the computer ex111. The coding processes may be performed by the camera ex116, the computer ex111, or the streaming server ex103, or shared among them.

Furthermore, the coding and decoding processes may be performed by an LSI ex500 generally included in each of the computer ex111 and the devices. The LSI ex500 may be configured of a single chip or a plurality of chips. Software for coding and decoding video may be integrated into some type of a recording medium (such as a CD-ROM, a flexible disk, and a hard disk) that is readable by the computer ex111 and others, and the coding and decoding processes may be performed using the software. Furthermore, when the cellular phone ex114 is equipped with a camera, the video data obtained by the camera may be transmitted. The video data is data coded by the LSI ex500 included in the cellular phone ex114.

Furthermore, the streaming server ex103 may be composed of servers and computers, and may decentralize data and process the decentralized data, record, or distribute data.

As described above, the clients may receive and reproduce the coded data in the content providing system ex100. In other words, the clients can receive and decode information transmitted by the user, and reproduce the decoded data in real time in the content providing system ex100, so that the user who does not have any particular right and equipment can implement personal broadcasting.

Figure 14:
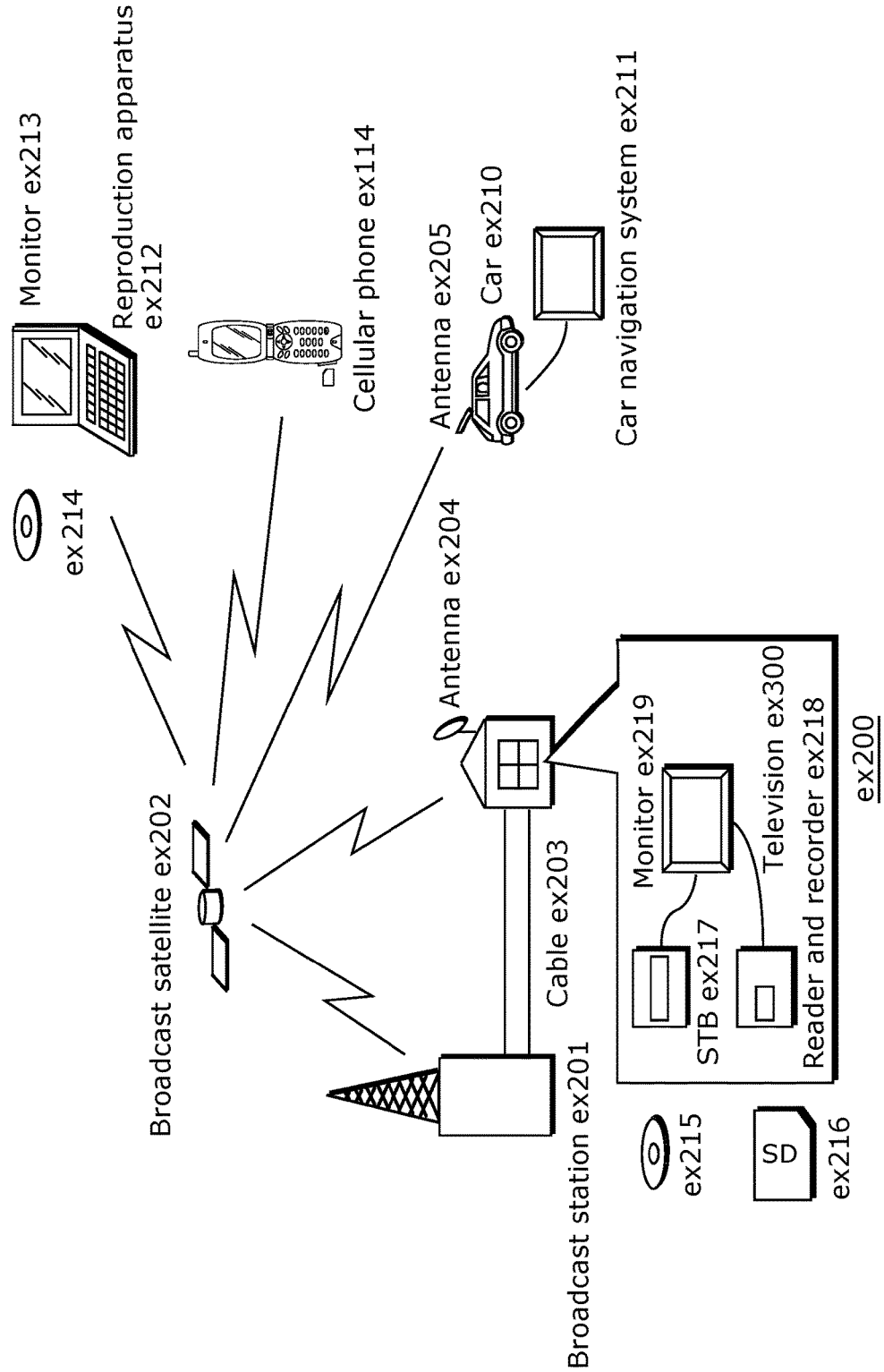
FIG. 14 is a diagram of an overall configuration of a digital broadcasting system.

Aside from the example of the content providing system ex100, at least one of the moving picture coding apparatus (image coding apparatus) and the moving picture decoding apparatus (image decoding apparatus) described in each of embodiments may be implemented in a digital broadcasting system ex200 illustrated in FIG. 14. More specifically, a broadcast station ex201 communicates or transmits, via radio waves to a broadcast satellite ex202, multiplexed data obtained by multiplexing audio data and others onto video data. The video data is data coded by the moving picture coding method described in each of embodiments. Upon receipt of the multiplexed data, the broadcast satellite ex202 transmits radio waves for broadcasting. Then, a home-use antenna ex204 with a satellite broadcast reception function receives the radio waves. Next, a device such as a television (receiver) ex300 and a set top box (STB) ex217 decodes the received multiplexed data, and reproduces the decoded data.

Furthermore, a reader/recorder ex218 (i) reads and decodes the multiplexed data recorded on a recording medium ex215, such as a DVD and a BD, or (i) codes video signals in the recording medium ex215, and in some cases, writes data obtained by multiplexing an audio signal on the coded data. The reader/recorder ex218 can include the moving picture decoding apparatus or the moving picture coding apparatus as shown in each of embodiments. In this case, the reproduced video signals are displayed on the monitor ex219, and can be reproduced by another device or system using the recording medium ex215 on which the multiplexed data is recorded. It is also possible to implement the moving picture decoding apparatus in the set top box ex217 connected to the cable ex203 for a cable television or to the antenna ex204 for satellite and/or terrestrial broadcasting, so as to display the video signals on the monitor ex219 of the television ex300. The moving picture decoding apparatus may be implemented not in the set top box but in the television ex300.

Figure 15:
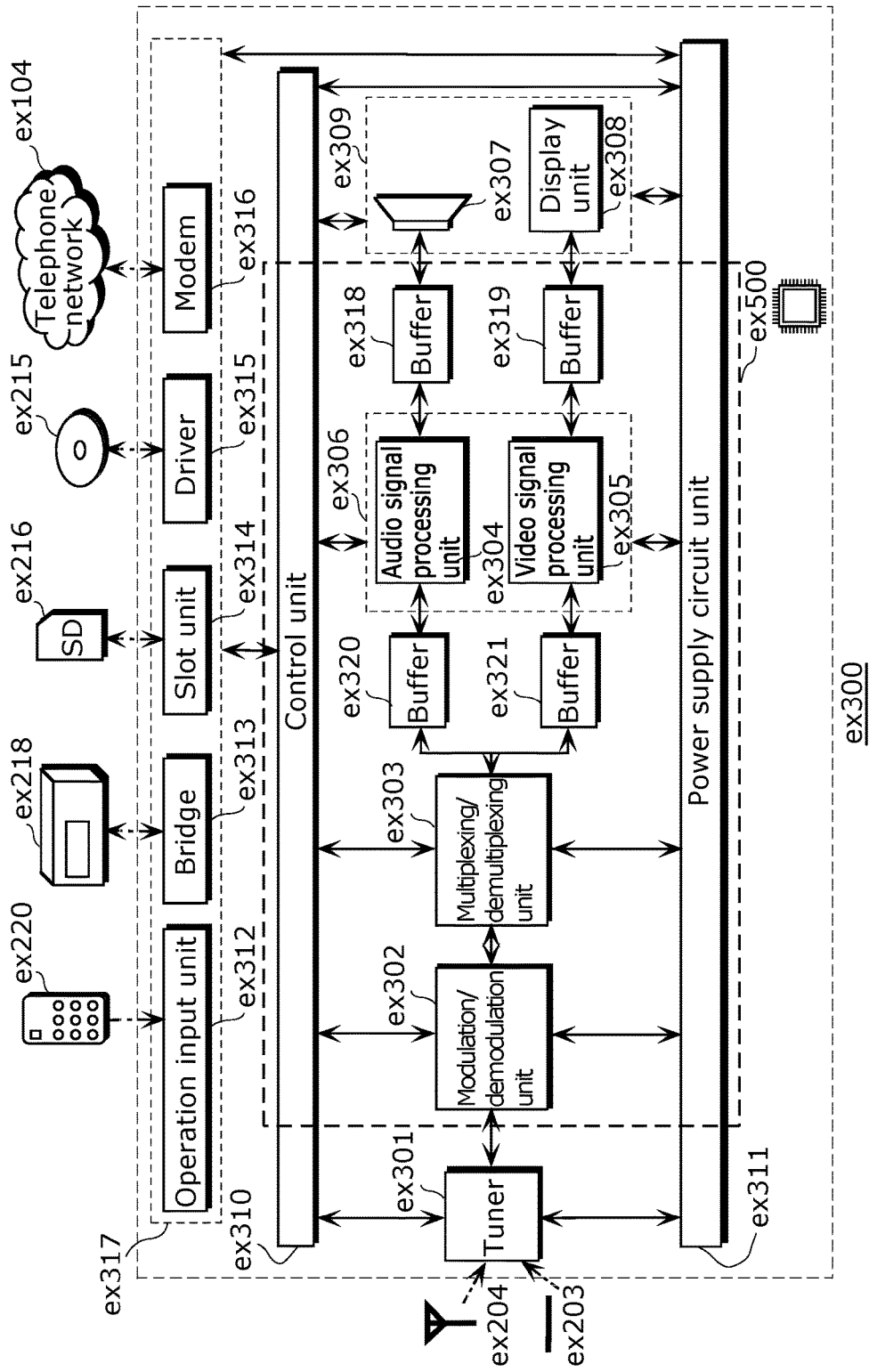
FIG. 15 is a block diagram showing an example of a configuration of a television.

FIG. 15 illustrates the television (receiver) ex300 that uses the moving picture coding method and the moving picture decoding method described in each of embodiments. The television ex300 includes: a tuner ex301 that obtains or provides multiplexed data obtained by multiplexing audio data onto video data, through the antenna ex204 or the cable ex203, etc. that receives a broadcast; a modulation/demodulation unit ex302 that demodulates the received multiplexed data or modulates data into multiplexed data to be supplied outside; and a multiplexing/demultiplexing unit ex303 that demultiplexes the modulated multiplexed data into video data and audio data, or multiplexes video data and audio data coded by a signal processing unit ex306 into data.

The television ex300 further includes: a signal processing unit ex306 including an audio signal processing unit ex304 and a video signal processing unit ex305 that decode audio data and video data and code audio data and video data, respectively; and an output unit ex309 including a speaker ex307 that provides the decoded audio signal, and a display unit ex308 that displays the decoded video signal, such as a display. Furthermore, the television ex300 includes an interface unit ex317 including an operation input unit ex312 that receives an input of a user operation. Furthermore, the television ex300 includes a control unit ex310 that controls overall each constituent element of the television ex300, and a power supply circuit unit ex311 that supplies power to each of the elements. Other than the operation input unit ex312, the interface unit ex317 may include: a bridge ex313 that is connected to an external device, such as the reader/recorder ex218; a slot unit ex314 for enabling attachment of the recording medium ex216, such as an SD card; a driver ex315 to be connected to an external recording medium, such as a hard disk; and a modem ex316 to be connected to a telephone network. Here, the recording medium ex216 can electrically record information using a non-volatile/volatile semiconductor memory element for storage. The constituent elements of the television ex300 are connected to each other through a synchronous bus.

First, the configuration in which the television ex300 decodes multiplexed data obtained from outside through the antenna ex204 and others and reproduces the decoded data will be described. In the television ex300, upon a user operation through a remote controller ex220 and others, the multiplexing/demultiplexing unit ex303 demultiplexes the multiplexed data demodulated by the modulation/demodulation unit ex302, under control of the control unit ex310 including a CPU. Furthermore, the audio signal processing unit ex304 decodes the demultiplexed audio data, and the video signal processing unit ex305 decodes the demultiplexed video data, using the decoding method described in each of embodiments, in the television ex300. The output unit ex309 provides the decoded video signal and audio signal outside, respectively. When the output unit ex309 provides the video signal and the audio signal, the signals may be temporarily stored in buffers ex318 and ex319, and others so that the signals are reproduced in synchronization with each other. Furthermore, the television ex300 may read multiplexed data not through a broadcast and others but from the recording media ex215 and ex216, such as a magnetic disk, an optical disk, and a SD card. Next, a configuration in which the television ex300 codes an audio signal and a video signal, and transmits the data outside or writes the data on a recording medium will be described. In the television ex300, upon a user operation through the remote controller ex220 and others, the audio signal processing unit ex304 codes an audio signal, and the video signal processing unit ex305 codes a video signal, under control of the control unit ex310 using the coding method described in each of embodiments. The multiplexing/demultiplexing unit ex303 multiplexes the coded video signal and audio signal, and provides the resulting signal outside. When the multiplexing/demultiplexing unit ex303 multiplexes the video signal and the audio signal, the signals may be temporarily stored in the buffers ex320 and ex321, and others so that the signals are reproduced in synchronization with each other. Here, the buffers ex318, ex319, ex320, and ex321 may be plural as illustrated, or at least one buffer may be shared in the television ex300. Furthermore, data may be stored in a buffer so that the system overflow and underflow may be avoided between the modulation/demodulation unit ex302 and the multiplexing/demultiplexing unit ex303, for example.

Furthermore, the television ex300 may include a configuration for receiving an AV input from a microphone or a camera other than the configuration for obtaining audio and video data from a broadcast or a recording medium, and may code the obtained data. Although the television ex300 can code, multiplex, and provide outside data in the description, it may be capable of only receiving, decoding, and providing outside data but not the coding, multiplexing, and providing outside data.

Furthermore, when the reader/recorder ex218 reads or writes multiplexed data from or on a recording medium, one of the television ex300 and the reader/recorder ex218 may decode or code the multiplexed data, and the television ex300 and the reader/recorder ex218 may share the decoding or coding.

Figure 16:
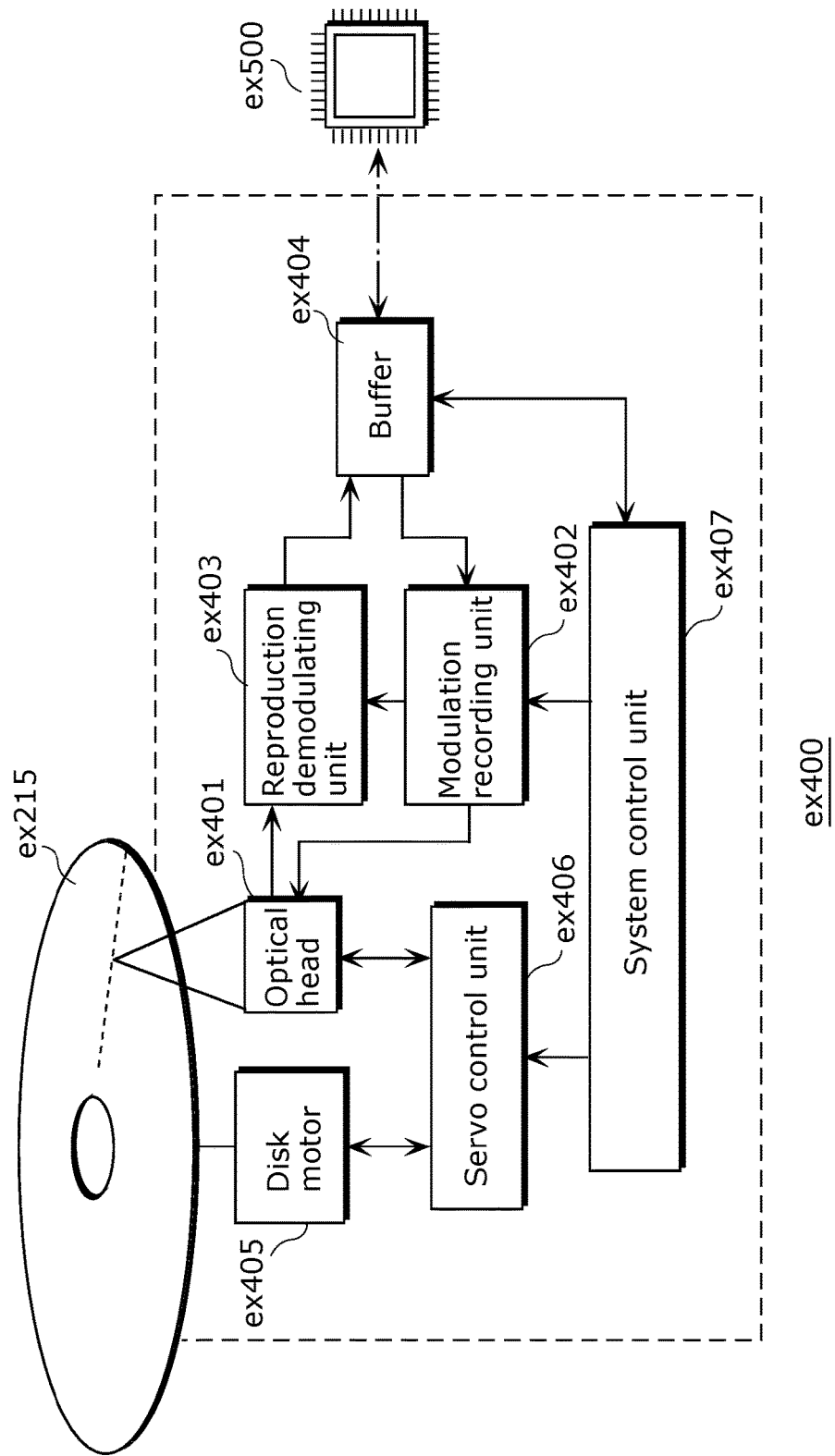
FIG. 16 is a block diagram showing an example of a configuration of an information reproducing/recording unit that reads and writes information from or on a recording medium that is an optical disk.

As an example, FIG. 16 illustrates a configuration of an information reproducing/recording unit ex400 when data is read or written from or on an optical disk. The information reproducing/recording unit ex400 includes constituent elements ex401, ex402, ex403, ex404, ex405, ex406, and ex407 to be described hereinafter. The optical head ex401 irradiates a laser spot in a recording surface of the recording medium ex215 that is an optical disk to write information, and detects reflected light from the recording surface of the recording medium ex215 to read the information. The modulation recording unit ex402 electrically drives a semiconductor laser included in the optical head ex401, and modulates the laser light according to recorded data. The reproduction demodulating unit ex403 amplifies a reproduction signal obtained by electrically detecting the reflected light from the recording surface using a photo detector included in the optical head ex401, and demodulates the reproduction signal by separating a signal component recorded on the recording medium ex215 to reproduce the necessary information. The buffer ex404 temporarily holds the information to be recorded on the recording medium ex215 and the information reproduced from the recording medium ex215.

The disk motor ex405 rotates the recording medium ex215. The servo control unit ex406 moves the optical head ex401 to a predetermined information track while controlling the rotation drive of the disk motor ex405 so as to follow the laser spot. The system control unit ex407 controls overall the information reproducing/recording unit ex400. The reading and writing processes can be implemented by the system control unit ex407 using various information stored in the buffer ex404 and generating and adding new information as necessary, and by the modulation recording unit ex402, the reproduction demodulating unit ex403, and the servo control unit ex406 that record and reproduce information through the optical head ex401 while being operated in a coordinated manner. The system control unit ex407 includes, for example, a microprocessor, and executes processing by causing a computer to execute a program for read and write.

Although the optical head ex401 irradiates a laser spot in the description, it may perform high-density recording using near field light.

Figure 17:
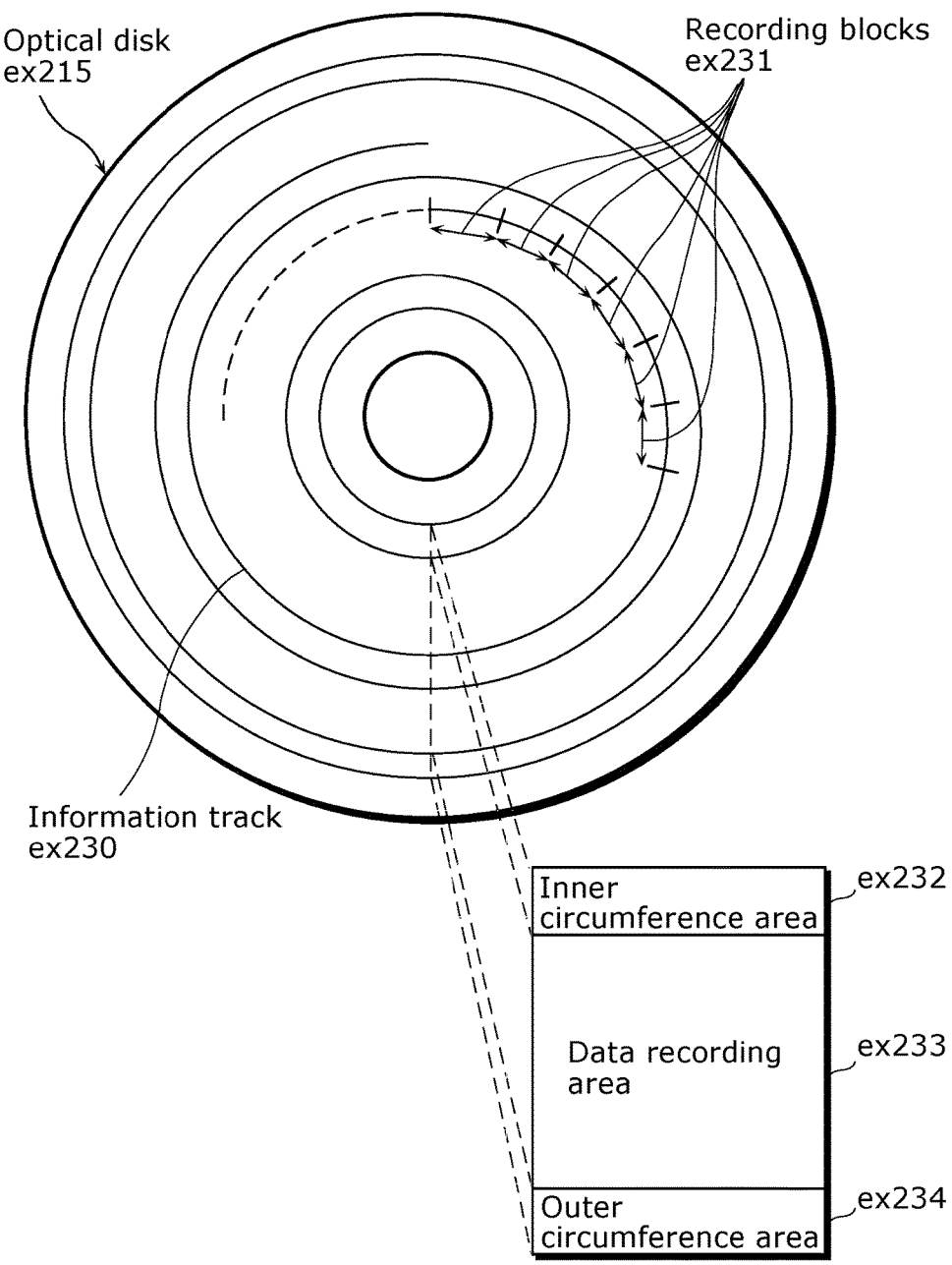
FIG. 17 is a diagram showing an example of a configuration of a recording medium that is an optical disk.

FIG. 17 illustrates the recording medium ex215 that is the optical disk. On the recording surface of the recording medium ex215, guide grooves are spirally formed, and an information track ex230 records, in advance, address information indicating an absolute position on the disk according to change in a shape of the guide grooves. The address information includes information for determining positions of recording blocks ex231 that are a unit for recording data. Reproducing the information track ex230 and reading the address information in an apparatus that records and reproduces data can lead to determination of the positions of the recording blocks. Furthermore, the recording medium ex215 includes a data recording area ex233, an inner circumference area ex232, and an outer circumference area ex234. The data recording area ex233 is an area for use in recording the user data. The inner circumference area ex232 and the outer circumference area ex234 that are inside and outside of the data recording area ex233, respectively are for specific use except for recording the user data. The information reproducing/recording unit 400 reads and writes coded audio, coded video data, or multiplexed data obtained by multiplexing the coded audio and video data, from and on the data recording area ex233 of the recording medium ex215.

Although an optical disk having a layer, such as a DVD and a BD is described as an example in the description, the optical disk is not limited to such, and may be an optical disk having a multilayer structure and capable of being recorded on a part other than the surface. Furthermore, the optical disk may have a structure for multidimensional recording/reproduction, such as recording of information using light of colors with different wavelengths in the same portion of the optical disk and for recording information having different layers from various angles.

Furthermore, a car ex210 having an antenna ex205 can receive data from the satellite ex202 and others, and reproduce video on a display device such as a car navigation system ex211 set in the car ex210, in the digital broadcasting system ex200. Here, a configuration of the car navigation system ex211 will be a configuration, for example, including a GPS receiving unit from the configuration illustrated in FIG. 15. The same will be true for the configuration of the computer ex111, the cellular phone ex114, and others.

Figure 18A:
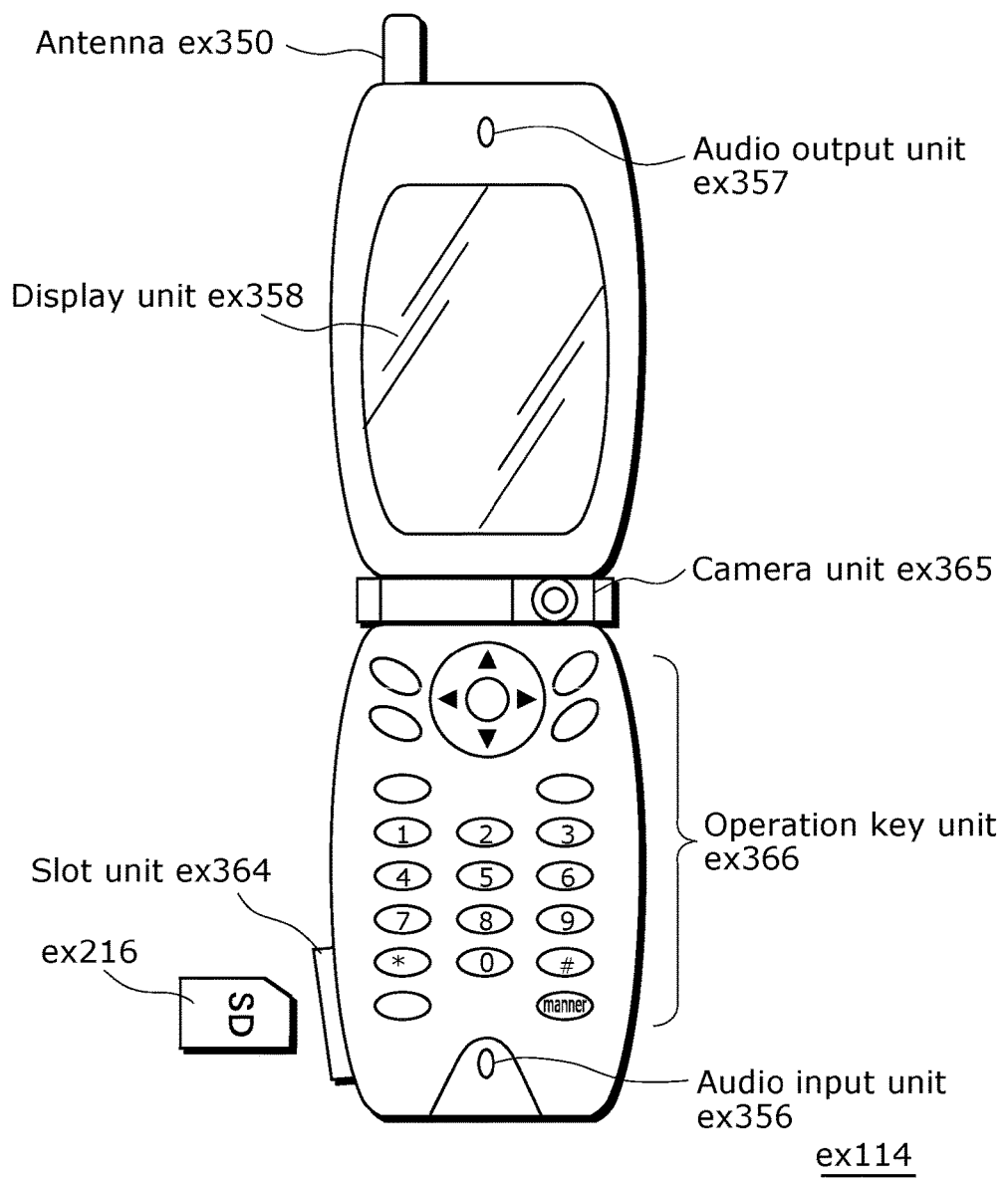
FIG. 18A is a diagram showing an example of a cellular phone.

FIG. 18A illustrates the cellular phone ex114 that uses the moving picture coding method and the moving picture decoding method described in embodiments. The cellular phone ex114 includes: an antenna ex350 for transmitting and receiving radio waves through the base station ex110; a camera unit ex365 capable of capturing moving and still images; and a display unit ex358 such as a liquid crystal display for displaying the data such as decoded video captured by the camera unit ex365 or received by the antenna ex350. The cellular phone ex114 further includes: a main body unit including an operation key unit ex366; an audio output unit ex357 such as a speaker for output of audio; an audio input unit ex356 such as a microphone for input of audio; a memory unit ex367 for storing captured video or still pictures, recorded audio, coded or decoded data of the received video, the still pictures, e-mails, or others; and a slot unit ex364 that is an interface unit for a recording medium that stores data in the same manner as the memory unit ex367.

Next, an example of a configuration of the cellular phone ex114 will be described with reference to FIG. 18B. In the cellular phone ex114, a main control unit ex360 designed to control overall each unit of the main body including the display unit ex358 as well as the operation key unit ex366 is connected mutually, via a synchronous bus ex370, to a power supply circuit unit ex361, an operation input control unit ex362, a video signal processing unit ex355, a camera interface unit ex363, a liquid crystal display (LCD) control unit ex359, a modulation/demodulation unit ex352, a multiplexing/demultiplexing unit ex353, an audio signal processing unit ex354, the slot unit ex364, and the memory unit ex367.

When a call-end key or a power key is turned ON by a user's operation, the power supply circuit unit ex361 supplies the respective units with power from a battery pack so as to activate the cell phone ex114.

In the cellular phone ex114, the audio signal processing unit ex354 converts the audio signals collected by the audio input unit ex356 in voice conversation mode into digital audio signals under the control of the main control unit ex360 including a CPU, ROM, and RAM.

Then, the modulation/demodulation unit ex352 performs spread spectrum processing on the digital audio signals, and the transmitting and receiving unit ex351 performs digital-to-analog conversion and frequency conversion on the data, so as to transmit the resulting data via the antenna ex350. Also, in the cellular phone ex114, the transmitting and receiving unit ex351 amplifies the data received by the antenna ex350 in voice conversation mode and performs frequency conversion and the analog-to-digital conversion on the data. Then, the modulation/demodulation unit ex352 performs inverse spread spectrum processing on the data, and the audio signal processing unit ex354 converts it into analog audio signals, so as to output them via the audio output unit ex357.

Furthermore, when an e-mail in data communication mode is transmitted, text data of the e-mail inputted by operating the operation key unit ex366 and others of the main body is sent out to the main control unit ex360 via the operation input control unit ex362. The main control unit ex360 causes the modulation/demodulation unit ex352 to perform spread spectrum processing on the text data, and the transmitting and receiving unit ex351 performs the digital-to-analog conversion and the frequency conversion on the resulting data to transmit the data to the base station ex110 via the antenna ex350. When an e-mail is received, processing that is approximately inverse to the processing for transmitting an e-mail is performed on the received data, and the resulting data is provided to the display unit ex358.

When video, still images, or video and audio in data communication mode is or are transmitted, the video signal processing unit ex355 compresses and codes video signals supplied from the camera unit ex365 using the moving picture coding method shown in each of embodiments, and transmits the coded video data to the multiplexing/demultiplexing unit ex353. In contrast, during when the camera unit ex365 captures video, still images, and others, the audio signal processing unit ex354 codes audio signals collected by the audio input unit ex356, and transmits the coded audio data to the multiplexing/demultiplexing unit ex353.

The multiplexing/demultiplexing unit ex353 multiplexes the coded video data supplied from the video signal processing unit ex355 and the coded audio data supplied from the audio signal processing unit ex354, using a predetermined method. Then, the modulation/demodulation unit (modulation/demodulation circuit unit) ex352 performs spread spectrum processing on the multiplexed data, and the transmitting and receiving unit ex351 performs digital-to-analog conversion and frequency conversion on the data so as to transmit the resulting data via the antenna ex350.

When receiving data of a video file which is linked to a Web page and others in data communication mode or when receiving an e-mail with video and/or audio attached, in order to decode the multiplexed data received via the antenna ex350, the multiplexing/demultiplexing unit ex353 demultiplexes the multiplexed data into a video data bit stream and an audio data bit stream, and supplies the video signal processing unit ex355 with the coded video data and the audio signal processing unit ex354 with the coded audio data, through the synchronous bus ex370. The video signal processing unit ex355 decodes the video signal using a moving picture decoding method corresponding to the moving picture coding method shown in each of embodiments, and then the display unit ex358 displays, for instance, the video and still images included in the video file linked to the Web page via the LCD control unit ex359. Furthermore, the audio signal processing unit ex354 decodes the audio signal, and the audio output unit ex357 provides the audio.

Furthermore, similarly to the television ex300, it is possible for a terminal such as the cellular phone ex114 to have 3 types of implementation configurations including not only (i) a transmitting and receiving terminal including both a coding apparatus and a decoding apparatus, but also (ii) a transmitting terminal including only a coding apparatus and (iii) a receiving terminal including only a decoding apparatus. Although the digital broadcasting system ex200 receives and transmits the multiplexed data obtained by multiplexing audio data onto video data in the description, the multiplexed data may be data obtained by multiplexing not audio data but character data related to video onto video data, and may be not multiplexed data but video data itself.

As such, the moving picture coding method and the moving picture decoding method in each of embodiments can be used in any of the devices and systems described. Thus, the advantages described in each of embodiments can be obtained.

Furthermore, the present invention is not limited to embodiments, and various modifications and revisions are possible without departing from the scope of the present invention.

[Embodiment 3]

Video data can be generated by switching, as necessary, between (i) the moving picture coding method or the moving picture coding apparatus shown in each of embodiments and (ii) a moving picture coding method or a moving picture coding apparatus in conformity with a different standard, such as MPEG-2, MPEG-4 AVC, and VC-1.

Here, when a plurality of video data that conforms to the different standards is generated and is then decoded, the decoding methods need to be selected to conform to the different standards. However, since the standard to which each of the plurality of the video data to be decoded conforms cannot be detected, there is a problem that an appropriate decoding method cannot be selected.

In order to solve the problem, multiplexed data obtained by multiplexing audio data and others onto video data has a structure including identification information indicating to which standard the video data conforms. The specific structure of the multiplexed data including the video data generated in the moving picture coding method and by the moving picture coding apparatus shown in each of embodiments will be hereinafter described. The multiplexed data is a digital stream in the MPEG-2 Transport Stream format.

FIG. 19 illustrates a structure of the multiplexed data. As illustrated in FIG. 19, the multiplexed data can be obtained by multiplexing at least one of a video stream, an audio stream, a presentation graphics stream (PG), and an interactive graphics stream. The video stream represents primary video and secondary video of a movie, the audio stream (IG) represents a primary audio part and a secondary audio part to be mixed with the primary audio part, and the presentation graphics stream represents subtitles of the movie. Here, the primary video is normal video to be displayed on a screen, and the secondary video is video to be displayed on a smaller window in the primary video. Furthermore, the interactive graphics stream represents an interactive screen to be generated by arranging the GUI components on a screen. The video stream is coded in the moving picture coding method or by the moving picture coding apparatus shown in each of embodiments, or in a moving picture coding method or by a moving picture coding apparatus in conformity with a conventional standard, such as MPEG-2, MPEG-4 AVC, and VC-1. The audio stream is coded in accordance with a standard, such as Dolby-AC-3, Dolby Digital Plus, MLP, DTS, DTS-HD, and linear PCM.

Each stream included in the multiplexed data is identified by PID. For example, 0x1011 is allocated to the video stream to be used for video of a movie, 0x1100 to 0x111F are allocated to the audio streams, 0x1200 to 0x121F are allocated to the presentation graphics streams, 0x1400 to 0x141F are allocated to the interactive graphics streams, 0x1B00 to 0x1B1F are allocated to the video streams to be used for secondary video of the movie, and 0x1A00 to 0x1A1F are allocated to the audio streams to be used for the secondary audio to be mixed with the primary audio.

Figure 20:
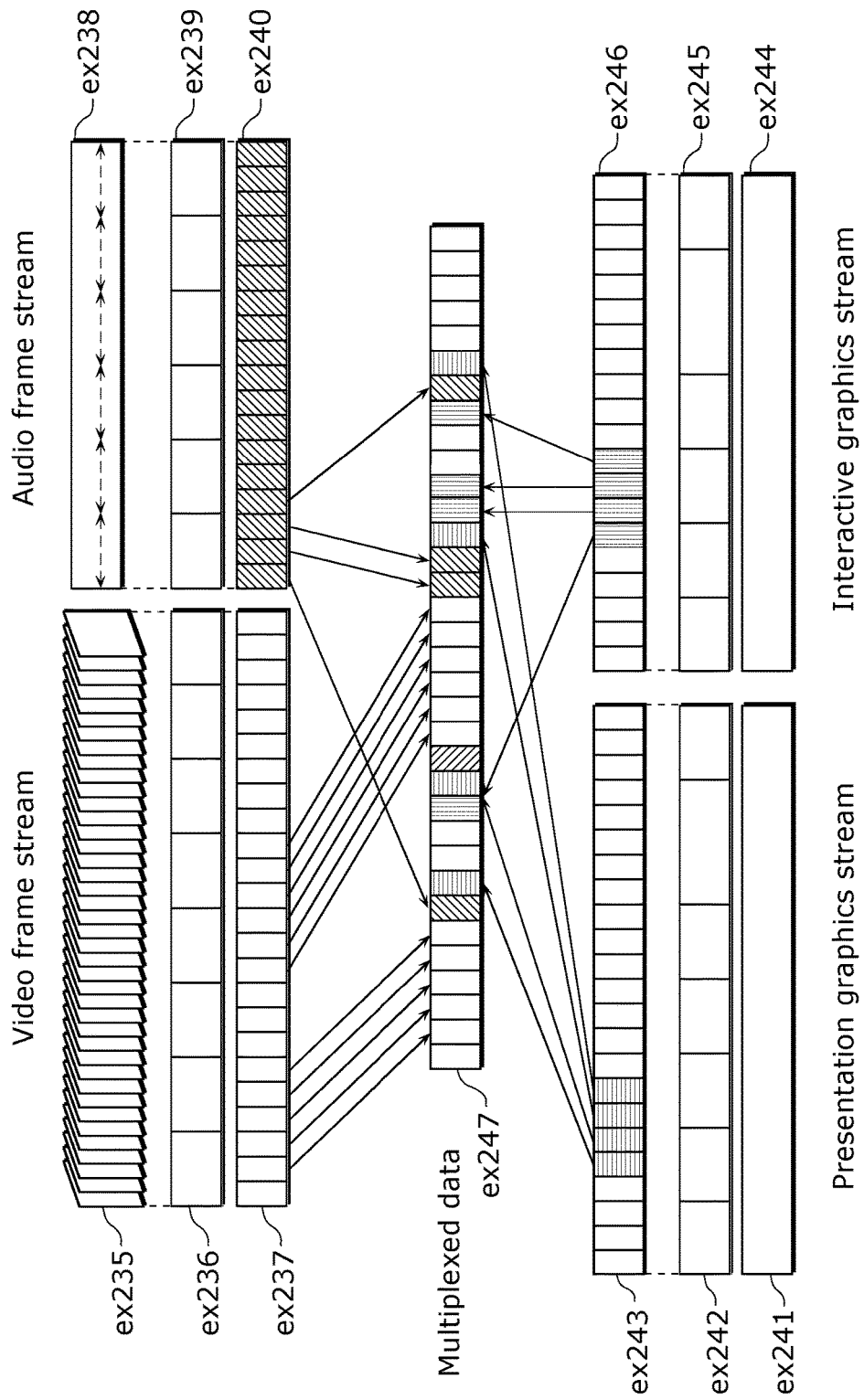
FIG. 20 is a diagram schematically illustrating how each stream is multiplexed in multiplexed data.

FIG. 20 schematically illustrates how data is multiplexed. First, a video stream ex235 composed of video frames and an audio stream ex238 composed of audio frames are transformed into a stream of PES packets ex236 and a stream of PES packets ex239, and further into TS packets ex237 and TS packets ex240, respectively. Similarly, data of a presentation graphics stream ex241 and data of an interactive graphics stream ex244 are transformed into a stream of PES packets ex242 and a stream of PES packets ex245, and further into TS packets ex243 and TS packets ex246, respectively. These TS packets are multiplexed into a stream to obtain multiplexed data ex247.

Figure 21:
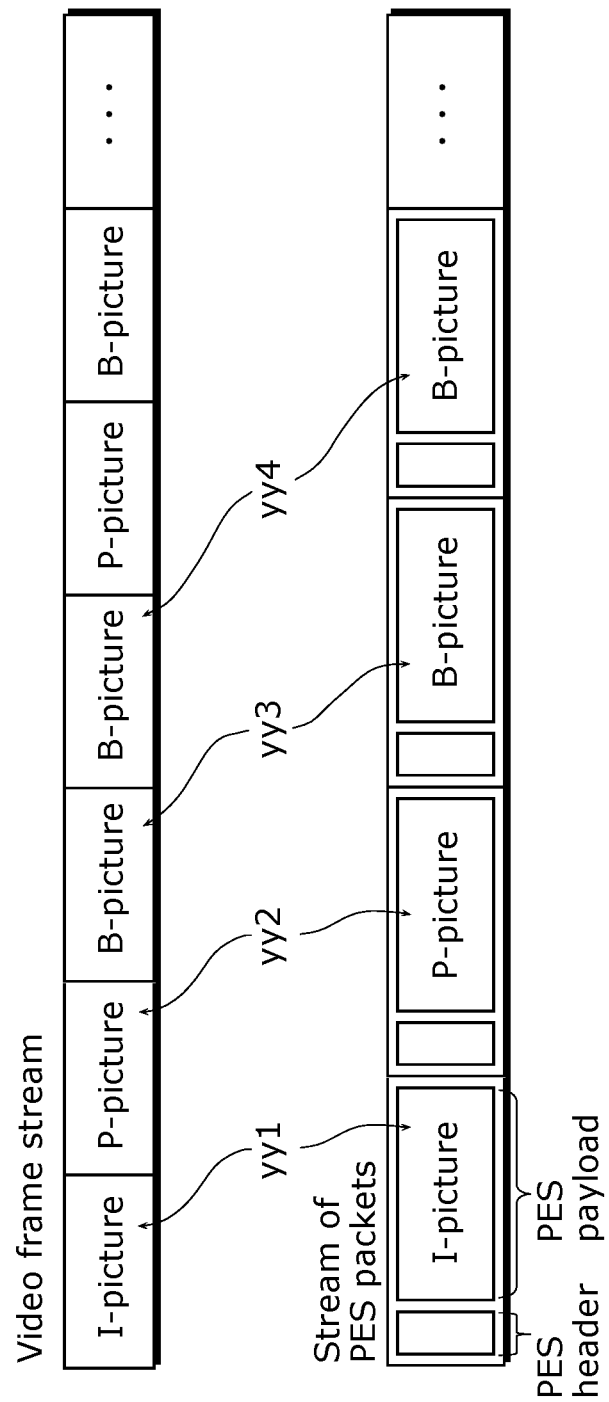
FIG. 21 is a diagram showing in more detail how a video stream is stored in a stream of PES packets.

FIG. 21 illustrates how a video stream is stored in a stream of PES packets in more detail. The first bar in FIG. 21 shows a video frame stream in a video stream. The second bar shows the stream of PES packets. As indicated by arrows denoted as yy1, yy2, yy3, and yy4 in FIG. 21, the video stream is divided into pictures as I pictures, B pictures, and P pictures each of which is a video presentation unit, and the pictures are stored in a payload of each of the PES packets. Each of the PES packets has a PES header, and the PES header stores a Presentation Time-Stamp (PTS) indicating a display time of the picture, and a Decoding Time-Stamp (DTS) indicating a decoding time of the picture.

FIG. 22 illustrates a format of TS packets to be finally written on the multiplexed data. Each of the TS packets is a 188-byte fixed length packet including a 4-byte TS header having information, such as a PID for identifying a stream and a 184-byte TS payload for storing data. The PES packets are divided, and stored in the TS payloads, respectively. When a BD ROM is used, each of the TS packets is given a 4-byte TP_Extra_Header, thus resulting in 192-byte source packets. The source packets are written on the multiplexed data. The TP_Extra_Header stores information such as an Arrival_Time_Stamp (ATS). The ATS shows a transfer start time at which each of the TS packets is to be transferred to a PID filter. The source packets are arranged in the multiplexed data as shown at the bottom of FIG. 22. The numbers incrementing from the head of the multiplexed data are called source packet numbers (SPNs).

Each of the TS packets included in the multiplexed data includes not only streams of audio, video, subtitles and others, but also a Program Association Table (PAT), a Program Map Table (PMT), and a Program Clock Reference (PCR). The PAT shows what a PID in a PMT used in the multiplexed data indicates, and a PID of the PAT itself is registered as zero. The PMT stores PIDs of the streams of video, audio, subtitles and others included in the multiplexed data, and attribute information of the streams corresponding to the PIDs. The PMT also has various descriptors relating to the multiplexed data. The descriptors have information such as copy control information showing whether copying of the multiplexed data is permitted or not. The PCR stores STC time information corresponding to an ATS showing when the PCR packet is transferred to a decoder, in order to achieve synchronization between an Arrival Time Clock (ATC) that is a time axis of ATSs, and an System Time Clock (STC) that is a time axis of PTSs and DTSs.

Figure 23:
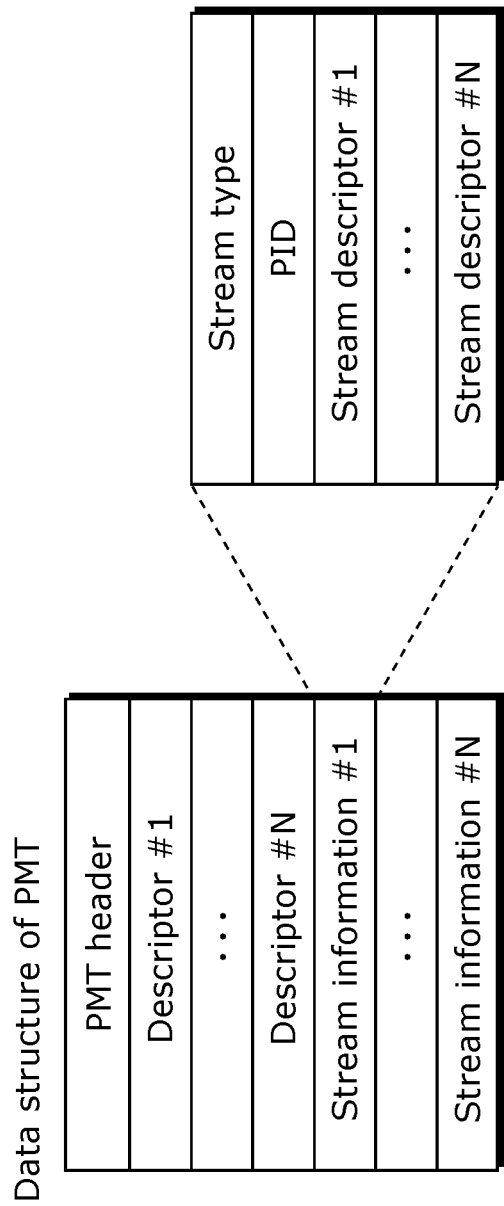
FIG. 23 is a diagram showing a data structure of a PMT.

FIG. 23 illustrates the data structure of the PMT in detail. A PMT header is disposed at the top of the PMT. The PMT header describes the length of data included in the PMT and others. A plurality of descriptors relating to the multiplexed data is disposed after the PMT header. Information such as the copy control information is described in the descriptors. After the descriptors, a plurality of pieces of stream information relating to the streams included in the multiplexed data is disposed. Each piece of stream information includes stream descriptors each describing information, such as a stream type for identifying a compression codec of a stream, a stream PID, and stream attribute information (such as a frame rate or an aspect ratio). The stream descriptors are equal in number to the number of streams in the multiplexed data.

When the multiplexed data is recorded on a recording medium and others, it is recorded together with multiplexed data information files.

Figure 24:
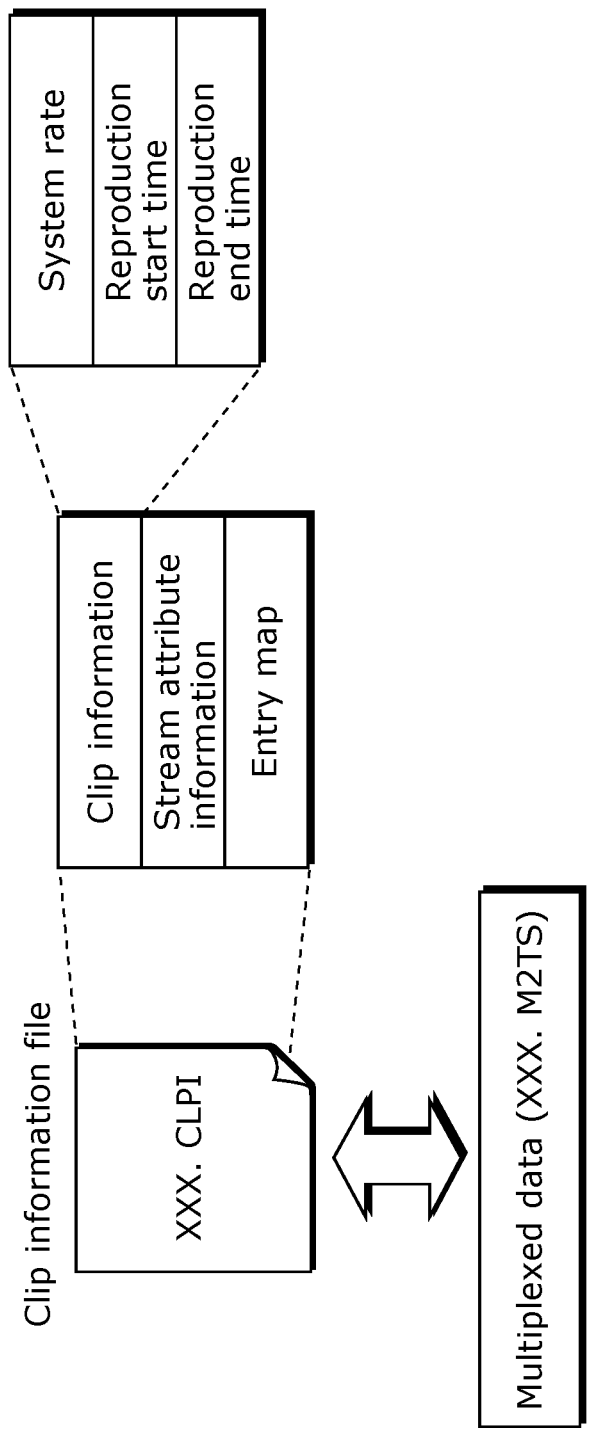
FIG. 24 is a diagram showing an internal structure of multiplexed data information.

Each of the multiplexed data information files is management information of the multiplexed data as shown in FIG. 24. The multiplexed data information files are in one to one correspondence with the multiplexed data, and each of the files includes multiplexed data information, stream attribute information, and an entry map.

As illustrated in FIG. 24, the multiplexed data information includes a system rate, a reproduction start time, and a reproduction end time. The system rate indicates the maximum transfer rate at which a system target decoder to be described later transfers the multiplexed data to a PID filter. The intervals of the ATSs included in the multiplexed data are set to not higher than a system rate. The reproduction start time indicates a PTS in a video frame at the head of the multiplexed data. An interval of one frame is added to a PTS in a video frame at the end of the multiplexed data, and the PTS is set to the reproduction end time.

Figure 25:
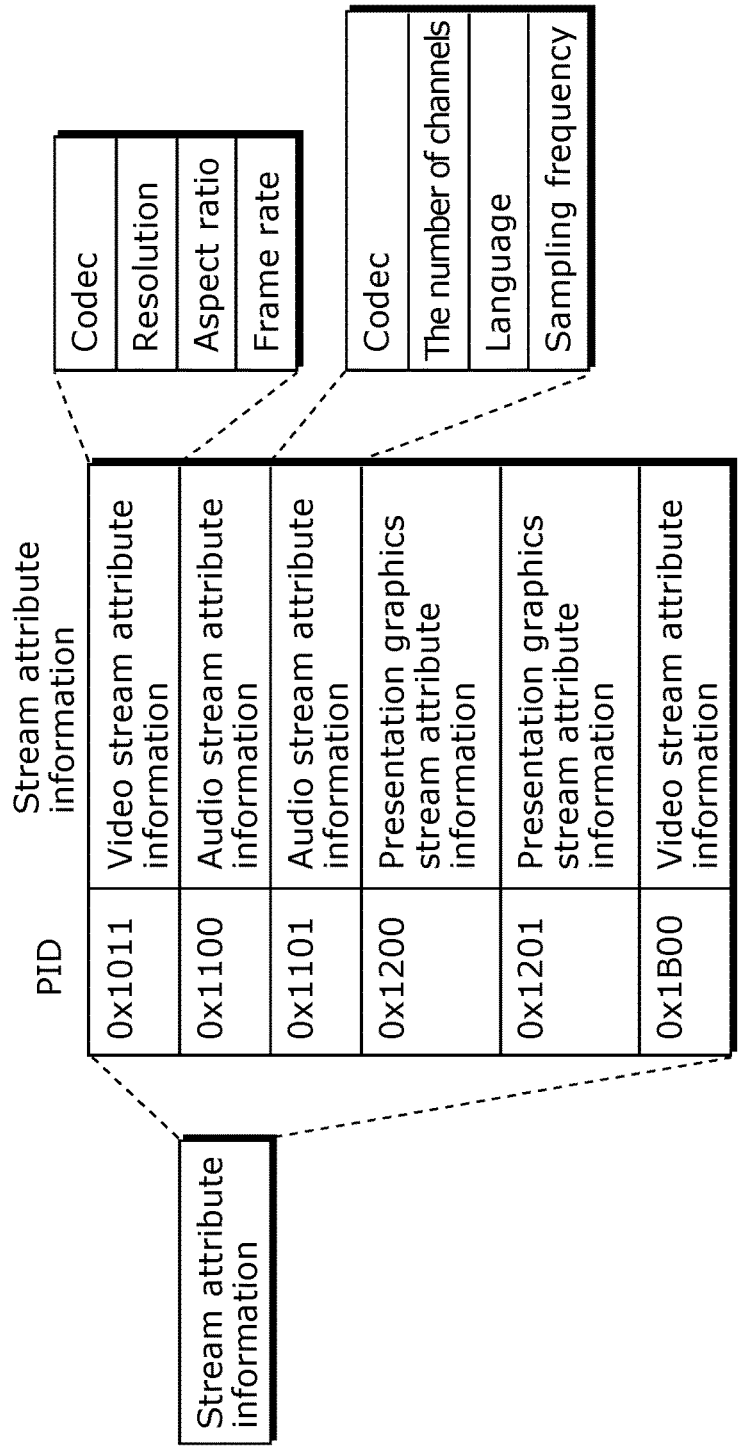
FIG. 25 is a diagram showing an internal structure of stream attribute information.

As shown in FIG. 25, a piece of attribute information is registered in the stream attribute information, for each PID of each stream included in the multiplexed data. Each piece of attribute information has different information depending on whether the corresponding stream is a video stream, an audio stream, a presentation graphics stream, or an interactive graphics stream. Each piece of video stream attribute information carries information including what kind of compression codec is used for compressing the video stream, and the resolution, aspect ratio and frame rate of the pieces of picture data that is included in the video stream. Each piece of audio stream attribute information carries information including what kind of compression codec is used for compressing the audio stream, how many channels are included in the audio stream, which language the audio stream supports, and how high the sampling frequency is. The video stream attribute information and the audio stream attribute information are used for initialization of a decoder before the player plays back the information.

In the present embodiment, the multiplexed data to be used is of a stream type included in the PMT. Furthermore, when the multiplexed data is recorded on a recording medium, the video stream attribute information included in the multiplexed data information is used. More specifically, the moving picture coding method or the moving picture coding apparatus described in each of embodiments includes a step or a unit for allocating unique information indicating video data generated by the moving picture coding method or the moving picture coding apparatus in each of embodiments, to the stream type included in the PMT or the video stream attribute information. With the configuration, the video data generated by the moving picture coding method or the moving picture coding apparatus described in each of embodiments can be distinguished from video data that conforms to another standard.

Figure 26:
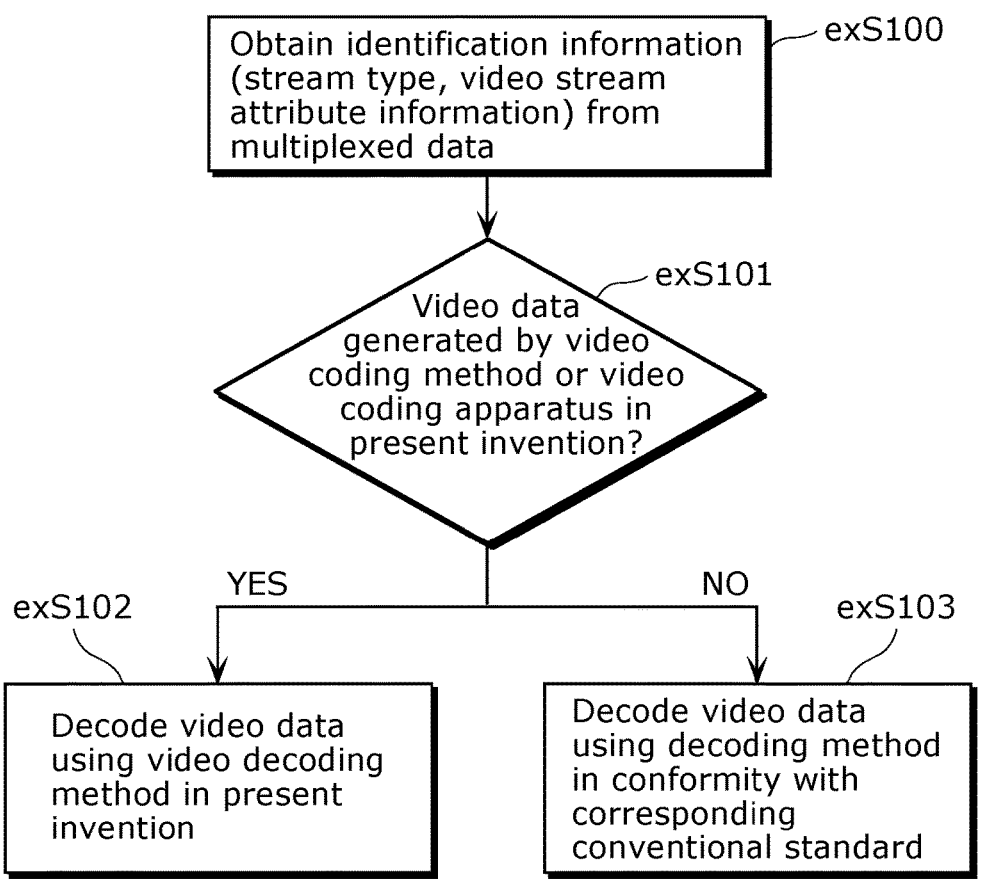
FIG. 26 is a diagram showing steps for identifying video data.

Furthermore, FIG. 26 illustrates steps of the moving picture decoding method according to the present embodiment. In Step exS100, the stream type included in the PMT or the video stream attribute information included in the multiplexed data information is obtained from the multiplexed data. Next, in Step exS101, it is determined whether or not the stream type or the video stream attribute information indicates that the multiplexed data is generated by the moving picture coding method or the moving picture coding apparatus in each of embodiments. When it is determined that the stream type or the video stream attribute information indicates that the multiplexed data is generated by the moving picture coding method or the moving picture coding apparatus in each of embodiments, in Step exS102, decoding is performed by the moving picture decoding method in each of embodiments. Furthermore, when the stream type or the video stream attribute information indicates conformance to the conventional standards, such as MPEG-2, MPEG-4 AVC, and VC-1, in Step exS103, decoding is performed by a moving picture decoding method in conformity with the conventional standards.

As such, allocating a new unique value to the stream type or the video stream attribute information enables determination whether or not the moving picture decoding method or the moving picture decoding apparatus that is described in each of embodiments can perform decoding. Even when multiplexed data that conforms to a different standard is input, an appropriate decoding method or apparatus can be selected. Thus, it becomes possible to decode information without any error. Furthermore, the moving picture coding method or apparatus, or the moving picture decoding method or apparatus in the present embodiment can be used in the devices and systems described above.

[Embodiment 4]

Figure 27:
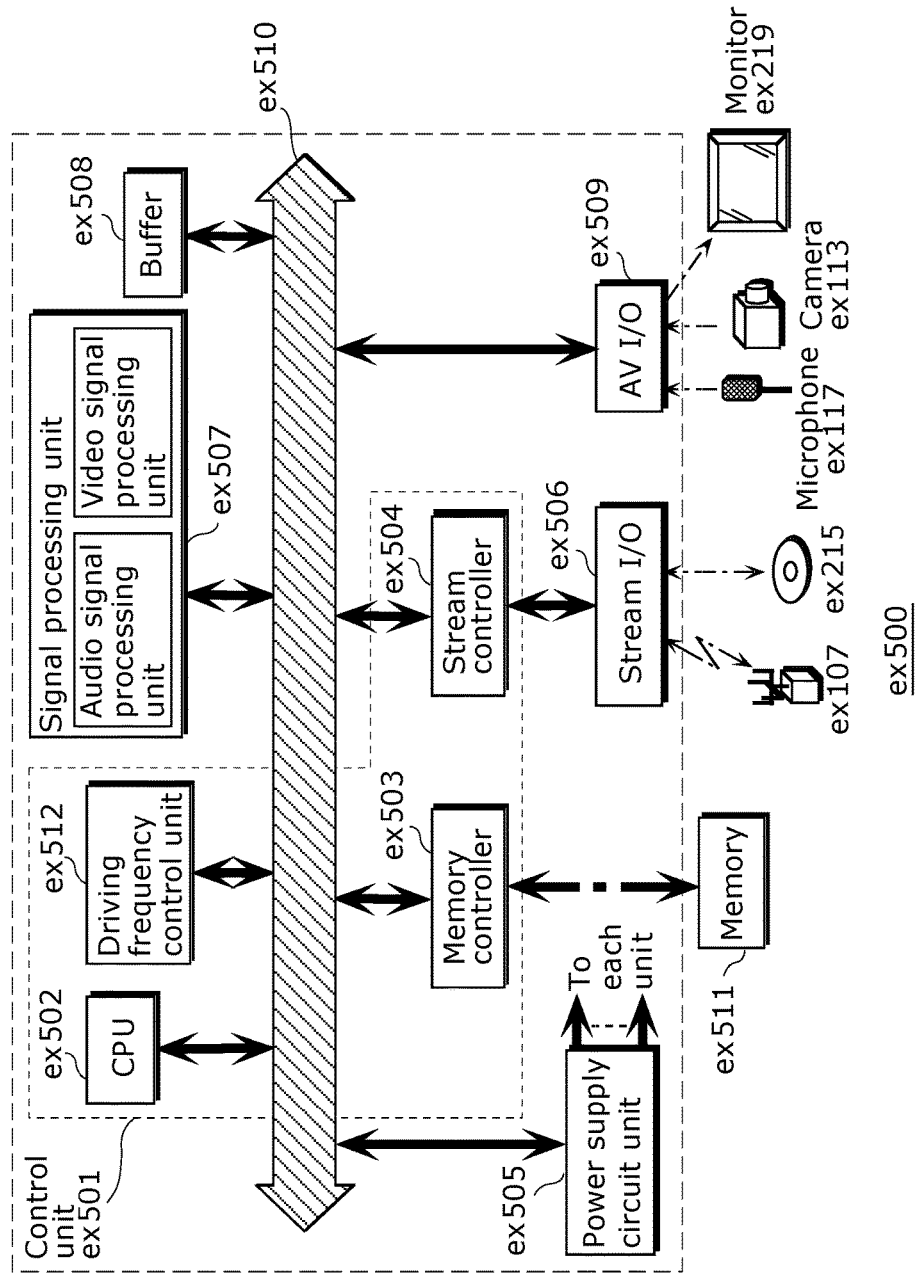
FIG. 27 is a block diagram illustrating an example of a configuration of an integrated circuit for implementing the moving picture coding method and the moving picture decoding method according to each of embodiments.

Each of the moving picture coding method, the moving picture coding apparatus, the moving picture decoding method, and the moving picture decoding apparatus in each of embodiments is typically achieved in the form of an integrated circuit or a Large Scale Integrated (LSI) circuit. As an example of the LSI, FIG. 27 illustrates a configuration of the LSI ex500 that is made into one chip. The LSI ex500 includes elements ex501, ex502, ex503, ex504, ex505, ex506, ex507, ex508, and ex509 to be described below, and the elements are connected to each other through a bus ex510. The power supply circuit unit ex505 is activated by supplying each of the elements with power when the power supply circuit unit ex505 is turned on.

For example, when coding is performed, the LSI ex500 receives an AV signal from a microphone ex117, a camera ex113, and others through an AV IO ex509 under control of a control unit ex501 including a CPU ex502, a memory controller ex503, a stream controller ex504, and a driving frequency control unit ex512. The received AV signal is temporarily stored in an external memory ex511, such as an SDRAM. Under control of the control unit ex501, the stored data is segmented into data portions according to the processing amount and speed to be transmitted to a signal processing unit ex507. Then, the signal processing unit ex507 codes an audio signal and/or a video signal. Here, the coding of the video signal is the coding described in each of embodiments. Furthermore, the signal processing unit ex507 sometimes multiplexes the coded audio data and the coded video data, and a stream IO ex506 provides the multiplexed data outside. The provided multiplexed data is transmitted to the base station ex107, or written on the recording medium ex215. When data sets are multiplexed, the data should be temporarily stored in the buffer ex508 so that the data sets are synchronized with each other.

Although the memory ex511 is an element outside the LSI ex500, it may be included in the LSI ex500. The buffer ex508 is not limited to one buffer, but may be composed of buffers. Furthermore, the LSI ex500 may be made into one chip or a plurality of chips.

Furthermore, although the control unit ex501 includes the CPU ex502, the memory controller ex503, the stream controller ex504, the driving frequency control unit ex512, the configuration of the control unit ex501 is not limited to such. For example, the signal processing unit ex507 may further include a CPU. Inclusion of another CPU in the signal processing unit ex507 can improve the processing speed. Furthermore, as another example, the CPU ex502 may serve as or be a part of the signal processing unit ex507, and, for example, may include an audio signal processing unit. In such a case, the control unit ex501 includes the signal processing unit ex507 or the CPU ex502 including a part of the signal processing unit ex507.

The name used here is LSI, but it may also be called IC, system LSI, super LSI, or ultra LSI depending on the degree of integration.

Moreover, ways to achieve integration are not limited to the LSI, and a special circuit or a general purpose processor and so forth can also achieve the integration. Field Programmable Gate Array (FPGA) that can be programmed after manufacturing LSIs or a reconfigurable processor that allows re-configuration of the connection or configuration of an LSI can be used for the same purpose.

In the future, with advancement in semiconductor technology, a brand-new technology may replace LSI. The functional blocks can be integrated using such a technology. The possibility is that the present invention is applied to biotechnology.

[Embodiment 5]

When video data generated in the moving picture coding method or by the moving picture coding apparatus described in each of embodiments is decoded, it is possible for the processing amount to increase compared to when video data that conforms to a conventional standard, such as MPEG-2, MPEG-4 AVC, and VC-1 is decoded. Thus, the LSI ex500 needs to be set to a driving frequency higher than that of the CPU ex502 to be used when video data in conformity with the conventional standard is decoded. However, when the driving frequency is set higher, there is a problem that the power consumption increases.

Figure 28:
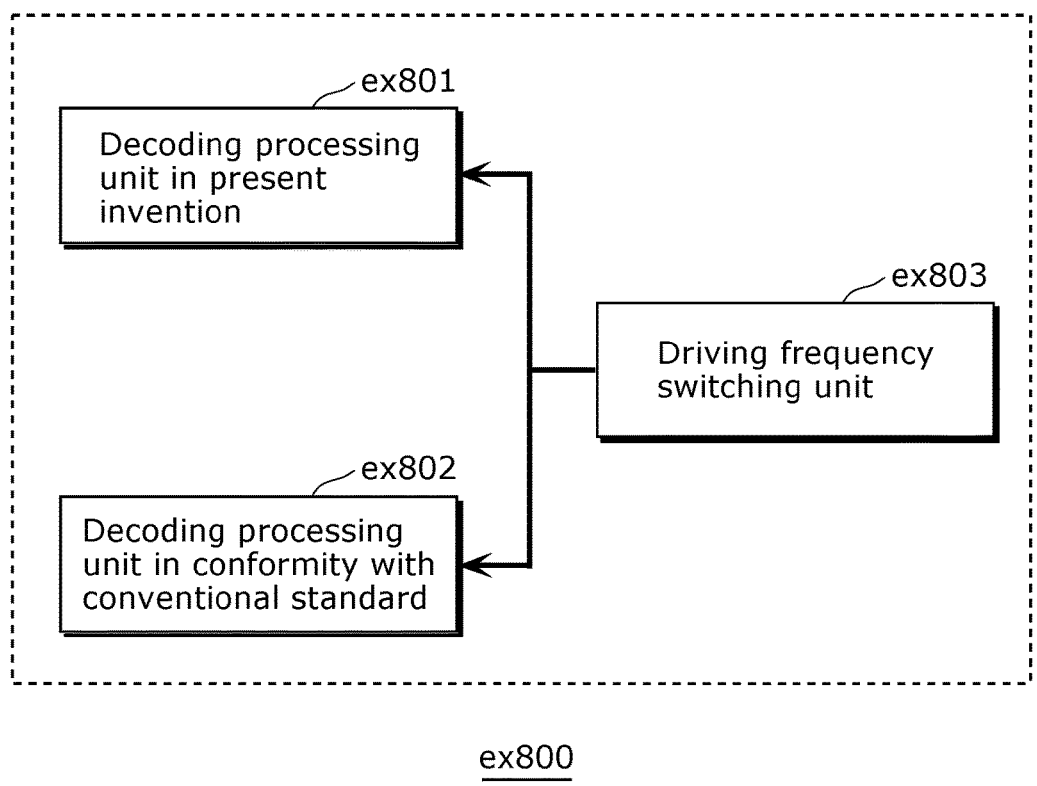
FIG. 28 is a diagram showing a configuration for switching between driving frequencies.

In order to solve the problem, the moving picture decoding apparatus, such as the television ex300 and the LSI ex500 is configured to determine to which standard the video data conforms, and switch between the driving frequencies according to the determined standard. FIG. 28 illustrates a configuration ex800 in the present embodiment. A driving frequency switching unit ex803 sets a driving frequency to a higher driving frequency when video data is generated by the moving picture coding method or the moving picture coding apparatus described in each of embodiments. Then, the driving frequency switching unit ex803 instructs a decoding processing unit ex801 that executes the moving picture decoding method described in each of embodiments to decode the video data. When the video data conforms to the conventional standard, the driving frequency switching unit ex803 sets a driving frequency to a lower driving frequency than that of the video data generated by the moving picture coding method or the moving picture coding apparatus described in each of embodiments. Then, the driving frequency switching unit ex803 instructs the decoding processing unit ex802 that conforms to the conventional standard to decode the video data.

More specifically, the driving frequency switching unit ex803 includes the CPU ex502 and the driving frequency control unit ex512 in FIG. 27. Here, each of the decoding processing unit ex801 that executes the moving picture decoding method described in each of embodiments and the decoding processing unit ex802 that conforms to the conventional standard corresponds to the signal processing unit ex507 in FIG. 27. The CPU ex502 determines to which standard the video data conforms. Then, the driving frequency control unit ex512 determines a driving frequency based on a signal from the CPU ex502. Furthermore, the signal processing unit ex507 decodes the video data based on the signal from the CPU ex502. For example, it is possible that the identification information described in Embodiment 3 is used for identifying the video data. The identification information is not limited to the one described in Embodiment 3 but may be any information as long as the information indicates to which standard the video data conforms. For example, when which standard video data conforms to can be determined based on an external signal for determining that the video data is used for a television or a disk, etc., the determination may be made based on such an external signal. Furthermore, the CPU ex502 selects a driving frequency based on, for example, a look-up table in which the standards of the video data are associated with the driving frequencies as shown in FIG. 30. The driving frequency can be selected by storing the look-up table in the buffer ex508 and in an internal memory of an LSI, and with reference to the look-up table by the CPU ex502.

Figure 29:
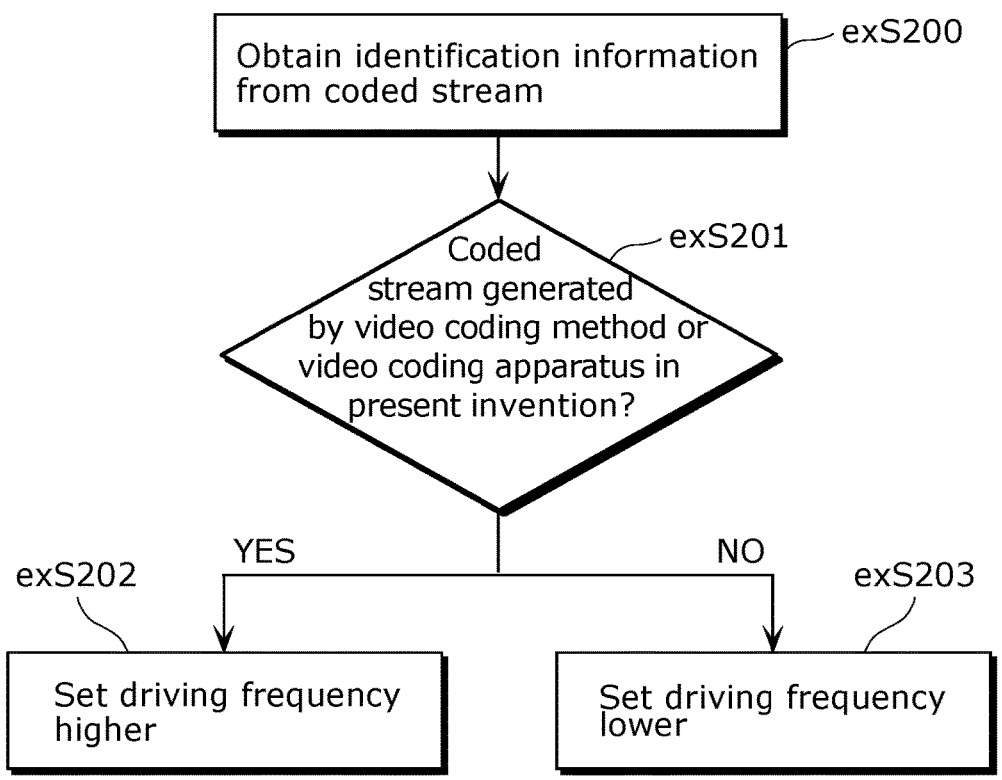
FIG. 29 is a diagram showing steps for identifying video data and switching between driving frequencies.

FIG. 29 illustrates steps for executing a method in the present embodiment. First, in Step exS200, the signal processing unit ex507 obtains identification information from the multiplexed data. Next, in Step exS201, the CPU ex502 determines whether or not the video data is generated by the coding method and the coding apparatus described in each of embodiments, based on the identification information. When the video data is generated by the moving picture coding method and the moving picture coding apparatus described in each of embodiments, in Step exS202, the CPU ex502 transmits a signal for setting the driving frequency to a higher driving frequency to the driving frequency control unit ex512. Then, the driving frequency control unit ex512 sets the driving frequency to the higher driving frequency. On the other hand, when the identification information indicates that the video data conforms to the conventional standard, such as MPEG-2, MPEG-4 AVC, and VC-1, in Step exS203, the CPU ex502 transmits a signal for setting the driving frequency to a lower driving frequency to the driving frequency control unit ex512. Then, the driving frequency control unit ex512 sets the driving frequency to the lower driving frequency than that in the case where the video data is generated by the moving picture coding method and the moving picture coding apparatus described in each of embodiment.

Furthermore, along with the switching of the driving frequencies, the power conservation effect can be improved by changing the voltage to be applied to the LSI ex500 or an apparatus including the LSI ex500. For example, when the driving frequency is set lower, it is possible that the voltage to be applied to the LSI ex500 or the apparatus including the LSI ex500 is set to a voltage lower than that in the case where the driving frequency is set higher.

Furthermore, when the processing amount for decoding is larger, the driving frequency may be set higher, and when the processing amount for decoding is smaller, the driving frequency may be set lower as the method for setting the driving frequency. Thus, the setting method is not limited to the ones described above. For example, when the processing amount for decoding video data in conformity with MPEG-4 AVC is larger than the processing amount for decoding video data generated by the moving picture coding method and the moving picture coding apparatus described in each of embodiments, it is possible that the driving frequency is set in reverse order to the setting described above.

Furthermore, the method for setting the driving frequency is not limited to the method for setting the driving frequency lower. For example, when the identification information indicates that the video data is generated by the moving picture coding method and the moving picture coding apparatus described in each of embodiments, it is possible that the voltage to be applied to the LSI ex500 or the apparatus including the LSI ex500 is set higher. When the identification information indicates that the video data conforms to the conventional standard, such as MPEG-2, MPEG-4 AVC, and VC-1, it is possible that the voltage to be applied to the LSI ex500 or the apparatus including the LSI ex500 is set lower. As another example, it is possible that, when the identification information indicates that the video data is generated by the moving picture coding method and the moving picture coding apparatus described in each of embodiments, the driving of the CPU ex502 is not suspended, and when the identification information indicates that the video data conforms to the conventional standard, such as MPEG-2, MPEG-4 AVC, and VC-1, the driving of the CPU ex502 is suspended at a given time because the CPU ex502 has extra processing capacity. Even when the identification information indicates that the video data is generated by the moving picture coding method and the moving picture coding apparatus described in each of embodiments, in the case where the CPU ex502 has extra processing capacity, the driving of the CPU ex502 is probably suspended at a given time. In such a case, it is possible that the suspending time is set shorter than that in the case where when the identification information indicates that the video data conforms to the conventional standard, such as MPEG-2, MPEG-4 AVC, and VC-1.

Accordingly, the power conservation effect can be improved by switching between the driving frequencies in accordance with the standard to which the video data conforms. Furthermore, when the LSI ex500 or the apparatus including the LSI ex500 is driven using a battery, the battery life can be extended with the power conservation effect.

[Embodiment 6]

There are cases where a plurality of video data that conforms to different standards, is provided to the devices and systems, such as a television and a cellular phone. In order to enable decoding the plurality of video data that conforms to the different standards, the signal processing unit ex507 of the LSI ex500 needs to conform to the different standards. However, the problems of increase in the scale of the circuit of the LSI ex500 and increase in the cost arise with the individual use of the signal processing units ex507 that conform to the respective standards.

Figure 31A:
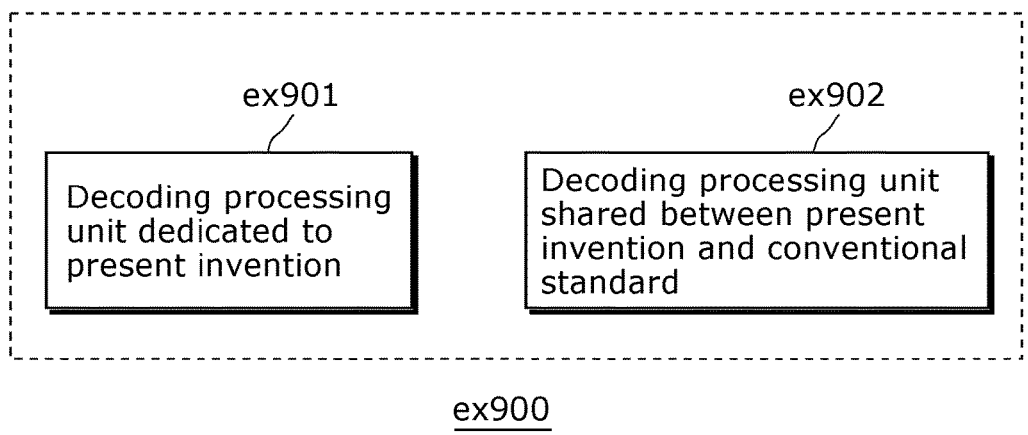
FIG. 31A is a diagram showing an example of a configuration for sharing a module of a signal processing unit.

In order to solve the problem, what is conceived is a configuration in which the decoding processing unit for implementing the moving picture decoding method described in each of embodiments and the decoding processing unit that conforms to the conventional standard, such as MPEG-2, MPEG-4 AVC, and VC-1 are partly shared. Ex900 in FIG. 31A shows an example of the configuration. For example, the moving picture decoding method described in each of embodiments and the moving picture decoding method that conforms to MPEG-4 AVC have, partly in common, the details of processing, such as entropy coding, inverse quantization, deblocking filtering, and motion compensated prediction. It is possible for a decoding processing unit ex902 that conforms to MPEG-4 AVC to be shared by common processing operations, and for a dedicated decoding processing unit ex901 to be used for processing which is unique to an aspect of the present invention. The decoding processing unit for implementing the moving picture decoding method described in each of embodiments may be shared for the processing to be shared, and a dedicated decoding processing unit may be used for processing unique to that of MPEG-4 AVC.

Figure 31B:
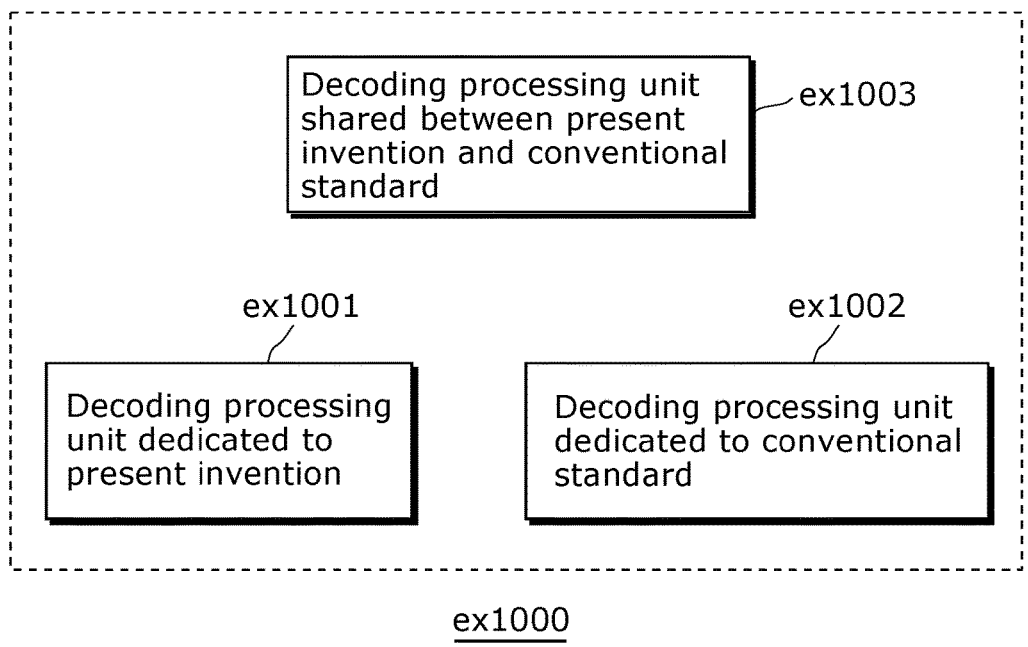
FIG. 31B is a diagram showing another example of a configuration for sharing a module of the signal processing unit.

Furthermore, ex1000 in FIG. 31B shows another example in that processing is partly shared. This example uses a configuration including a dedicated decoding processing unit ex1001 that supports the processing unique to the present invention, a dedicated decoding processing unit ex1002 that supports the processing unique to another conventional standard, and a decoding processing unit ex1003 that supports processing to be shared between the moving picture decoding method according to the present invention and the conventional moving picture decoding method. Here, the dedicated decoding processing units ex1001 and ex1002 are not necessarily specialized for the processing according to the present invention and the processing of the conventional standard, respectively, and may be the ones capable of implementing general processing. Furthermore, the configuration of the present embodiment can be implemented by the LSI ex500.

As such, reducing the scale of the circuit of an LSI and reducing the cost are possible by sharing the decoding processing unit for the processing to be shared between the moving picture decoding method according to the present invention and the moving picture decoding method in conformity with the conventional standard.

Note that embodiments disclosed herein are, in all points, exemplifications and are thus not restrictive. The scope of the present invention is indicated by the Claims and not by the aforementioned descriptions, and all modifications having the same meaning, and which are within the scope of the Claims are intended to be included in the present invention.

INDUSTRIAL APPLICABILITY

The image coding method and the image decoding method according to the present invention can be used in, for example, as televisions, digital video recorders, car navigation systems, cellular phones, digital cameras, digital video cameras, and so on.

REFERENCE SIGNS LIST

102 Subtractor
103 Orthogonal transform unit
104 Quantization unit
105 Variable-length coding unit
106, 206 Inverse-quantization unit
107, 207 Inverse-orthogonal transform unit
108, 208 Adder
109, 209 Block memory
110, 210 Intra prediction unit
111, 211 Frame memory
112, 212 Inter prediction unit
113, 213 Switch
121, 131, 221, 231 Inter prediction control unit
124 Picture type determination unit
125 Motion vector predictor competition flag switching unit
126 Skip block motion vector predictor competition flag switching unit
205 Variable-length decoding unit

The invention claimed is:

1. An image decoding method comprising:

decoding first information from a coded signal, the first information indicating whether or not a motion vector predictor can be selected from among one or more motion vector predictor candidates;

decoding second information when the first information indicates that a motion vector predictor can be selected, the second information indicating whether or not a motion vector predictor is selected, in skip mode, from among the one or more motion vector predictor candidates for decoding a current block to be decoded;

decoding, from the coded signal, index information indicating a motion vector predictor to be selected from among the one or more motion vector predictor candidates, when both (a) the first information indicates that a motion vector predictor can be selected and (b) the second information indicates that a motion vector predictor is selected, in the skip mode, for the decoding of the current block; and decoding the current block using the motion vector predictor selected based on the index information, wherein the coded signal does not include the second information when the first information does not indicate that the motion vector predictor can be selected.

2. An image decoding apparatus comprising:

a decoding unit configured to:

(i) decode first information from a coded signal, the first information indicating whether or not a motion vector predictor can be selected from among one or more motion vector predictor candidates;

(ii) decode second information when the first information indicates that a motion vector predictor can be selected, the second information indicating whether or not a motion vector predictor is selected, in skip mode, from among the one or more motion vector predictor candidates for decoding a current block to be decoded;

(iii) decode, from the coded signal, index information indicating a motion vector predictor to be selected from among the one or more motion vector predictor candidates, when both (a) the first information indicates that a motion vector predictor can be selected and (b) the second information indicates that a motion vector predictor is selected, in the skip mode, for the decoding of the current block; and (iv) decode the current block using the motion vector predictor selected based on the index information, wherein the coded signal does not include the second information when the first information does not indicate that the motion vector predictor can be selected.

* * * * *